United States Patent [19]

Pedrazzi

[11] Patent Number: 4,877,412

[45] Date of Patent: Oct. 31, 1989

[54] SULFO GROUP-CONTAINING MONOAZO COMPOUNDS HAVING AN UNSUBSTITUTED OR SUBSTITUTED 4-(BENZOTHIAZOL-2'-YL)PHENYL OR 4-(6'-BENZOTHIAZOL-2''YL)-BENZO-THIAZOL-2'-YL)PHENYLDIAZO COMPONENT RADICAL AND A 6-HYDROXYPYRID-2-ONE COUPLING COMPONENT RADICAL

[75] Inventor: Reinhard Pedrazzi, Allschwil, Switzerland

[73] Assignee: Sandoz Ltd., Basel, Switzerland

[21] Appl. No.: 183,566

[22] Filed: Mar. 31, 1988

Related U.S. Application Data

[63] Continuation of Ser. No. 30,948, Mar. 26, 1987, abandoned, which is a continuation-in-part of Ser. No. 877,659, filed as PCT EP85/00491 on Sep. 20, 1985, abandoned.

[30] Foreign Application Priority Data

Sep. 22, 1984 [DE] Fed. Rep. of Germany ....... 3434921

[51] Int. Cl.$^4$ ............... C09B 29/01; C09B 44/08; D06P 1/02; D21H 3/80
[52] U.S. Cl. ............................................ 8/437; 8/527; 8/684; 8/691; 8/918; 8/919; 534/606; 534/751; 534/753; 534/774; 534/775; 534/781; 534/782; 534/885
[58] Field of Search ............... 8/527, 437, 684; 534/606, 659, 751, 775, 781, 782

[56] References Cited

U.S. PATENT DOCUMENTS

| | | | |
|---|---|---|---|
| 3,726,851 | 4/1973 | Litke | 8/457 |
| 3,788,802 | 1/1974 | Litke | 8/684 |
| 3,862,116 | 1/1975 | Toji | 8/684 |
| 3,995,997 | 12/1976 | Boehmke et al. | 8/527 |
| 4,071,312 | 1/1978 | Blackwell | 8/648 |
| 4,525,583 | 6/1985 | Adam | 534/606 |

FOREIGN PATENT DOCUMENTS

| | | |
|---|---|---|
| 30337 | 6/1981 | European Pat. Off. |
| 2033281 | 1/1972 | Fed. Rep. of Germany |
| 1333023 | 10/1973 | United Kingdom |
| 1344000 | 1/1974 | United Kingdom |
| 1508264 | 4/1978 | United Kingdom |
| 1593859 | 7/1981 | United Kingdom |

Primary Examiner—A. Lionel Clingman
Attorney, Agent, or Firm—Gerald D. Sharkin; Richard E. Vila; Melvyn M. Kassenoff

[57] ABSTRACT

Compounds of the formula

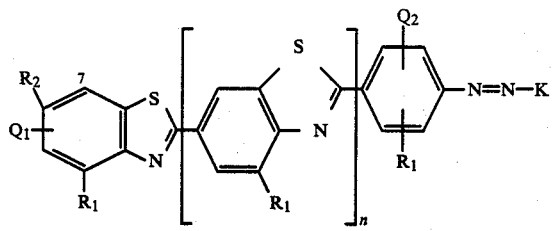

in free acid or salt form and internal, external and acid addition salts thereof, wherein K is

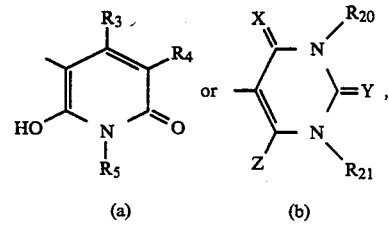

(a) (b)

wherein $R_3$–$R_5$, $R_{20}$, $R_{21}$ and X-Z are as defined in the specification,
each of $Q_1$ and $Q_2$ is independently hydrogen or —SO$_3$M$_1$,
each $R_1$ and $R_2$ is independently hydrogen, C$_{1-4}$alkyl, C$_{1-4}$alkoxy or —COOM, and
n is 0 or 1,
wherein each M and M$_1$ is independently hydrogen or a nonchromophoric cation, with the provisos that (i) the compound contains at least one —SO$_3$M or —SO$_3$M$_1$ group, (ii) when K is a group of Formula (a), at least one of $R_4$ and $R_5$ is hydrogen, (iii) the total number of anionic groups equals or exceeds the total number of basic and cationic groups, (iv) the positive charge of each cationic group is balanced by the negative charge of an —SO$_3^\ominus$ or —COO$^\ominus$ group of the molecule or of an external nonchromophoric anion, (v) when, simultaneously (1) at least one of $Q_1$ and $Q_2$ is —SO$_3$M$_1$, and $R_2$ is other than —COOM, and (2) K is a group of Formula (b) wherein Y is O or S, then at least one M$_1$ is a quaternary ammonium cation, (vi) when, simultaneously (1) $Q_1$ is 7-SO$_3$M$_1$, $Q_2$ is hydrogen, each $R_1$ is hydrogen, $R_2$ is methyl, and n is 0, and (2) K is a group of Formula (b) wherein each of $R_{20}$ and $R_{21}$ is hydrogen, and Y is =NH, then M$_1$ is other than hydrogen and sodium, and (vii) when, simultaneously (1) $Q_1$ is 7-SO$_3$M$_1$, $Q_2$ is hydrogen, each $R_1$ is hydrogen, $R_2$ is methyl, and n is 0, and (2) K is a group of Formula (b) wherein each of $R_{20}$ and $R_{21}$ is hydrogen, X is O, Y is =N—CN or =N—CONH$_2$, and Z is —OH, then M$_1$ is a quaternary ammonium cation, are dyes for hydroxy group- and nitrogen-containing organic substrates, for example, textiles consisting of or comprising a cellulosic material, leather and paper. They are employed as such or in the form of solid or, preferably aqueous liquid dye compositions.

20 Claims, No Drawings

SULFO GROUP-CONTAINING MONOAZO COMPOUNDS HAVING AN UNSUBSTITUTED OR SUBSTITUTED 4-(BENZOTHIAZOL-2'-YL)PHENYL OR 4-(6'-BENZOTHIAZOL-2"YL)-BENZOTHIAZOL-2'-YL)PHENYLDIAZO COMPONENT RADICAL AND A 6-HYDROXYPYRID-2-ONE COUPLING COMPONENT RADICAL

This is a continuation of application Ser. No. 030,948, filed Mar. 26, 1987 and now abandoned, which is a continuation-in-part of application Ser. No. 877,659, filed as PCT EP85/00491 on Sep. 20, 1985, now abandoned.

The invention relates to anionic heterocyclic compounds suitable for use as dyestuffs.

More particularly, this invention provides compounds which, in one of the possible tautomeric forms, correspond to formula I,

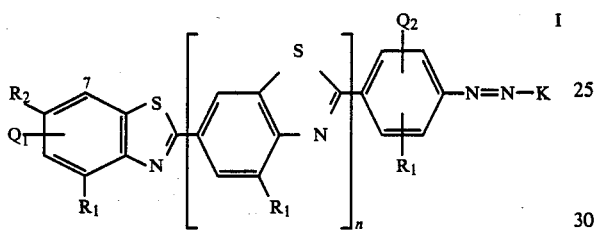

in which
each $R_1$ and $R_2$ is independently hydrogen, $C_{1-4}$alkyl, $C_{1-4}$alkoxy or COOM,
each of $Q_1$ and $Q_2$ is independently hydrogen or $SO_3M_1$, n is 0 or 1,
each M and $M_1$ is independently hydrogen or a nonchromophoric cation,
K is one of the groups (a) and (b),

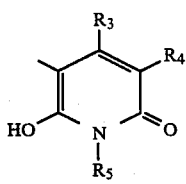

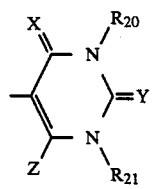

in which
$R_3$ is hydrogen; CN; $NH_2$; OH; $C_{1-4}$alkoxy; $C_{1-4}$alkyl; $C_{2-4}$alkyl monosubstituted by hydroxy or $C_{1-4}$alkoxy; $C_{5-6}$cycloalkyl; phenyl or phenyl-$C_{1-4}$alkyl which phenyl group of the latter two groups is unsubstituted or substituted by one to three groups selected from $C_{1-4}$alkyl, $C_{1-4}$alkoxy, halogen, COOM and $SO_3M$; a saturated or unsaturated 5- or 6-membered heterocyclic ring containing one to three hetero atoms which is unsubstituted or further substituted by one to three $C_{1-4}$-alkyl groups and which is bound by a carbon or nitrogen atom directly or via a bridge member provided that any

is bound via a bridge member; —$COR_6$ or —$(CH_2)_{1-3}$—$R_7$,
$R_6$ is OH, $NH_2$ or $C_{1-4}$alkoxy,
$R_7$ is CN, halogen, $SO_3M$, —$OSO_3M$, —$COR_8$ or

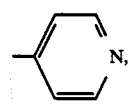

$R_8$ is OH; $NH_2$; $C_{1-4}$alkyl which is unsubstituted or monosubstituted by OH, halogen, CN or $C_{1-4}$alkoxy, $C_{1-4}$alkoxy; or phenoxy, phenyl or phenyl-$C_{1-4}$alkyl in which the phenyl groups of the latter three groups are unsubstituted or substituted by one to three groups selected from $C_{1-4}$alkyl, $C_{1-4}$alkoxy, halogen, COOM and $SO_3M$;
$R_4$ is hydrogen; CN; halogen; $SO_3M$; NO; $NO_2$; —$NR_9R_{10}$; $C_{1-4}$alkyl which is unsubstituted or monosubstituted by OH, halogen, CN, $C_{1-4}$alkoxy, phenyl, $SO_3M$ or —$OSO_3M$; —$SO_2NH_2$; —$COR_{11}$; —$CH_2NHCOR_{12}E$;

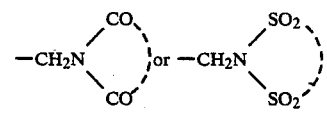

in which the carbonyl or sulphonyl groups are bound to two carbon atoms of an aromatic ring which are in ortho position to each other;
a group of the formula

in which the $N^\oplus$ ion is part of a 5- or 6-membered ring containing one to three hetero atoms which is further unsubstituted or substituted by one or two methyl groups or by $NH_2$, —$NHC_{1-4}$alkyl or —$N(C_{1-4}alkyl)_2$; benzoimidazolium-1, unsubstituted or monosubstituted by methyl, amino, methylamino or dimethylamino; or a group of the formula

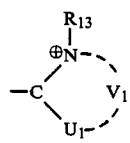

in which
$R_{13}$ is hydrogen or $C_{1-4}$alkyl which is unsubstituted or monosubstituted by OH, halogen, CN, $C_{1-4}$alkoxy or phenyl,
$U_1$ is —S—,

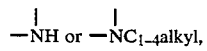

and $V_1$ is a group necessary to form a 5- or 6-membered ring to which ring a further 5- or 6-membered carbocyclic or heterocyclic ring containing one or two hetero atoms may be condensed, or both $R_3$ and $R_4$ together form a $C_3$- or $C_4$-chain which may be part of a further 5- or 6-membered ring by two vicinal chain members, each of $R_9$ and $R_{10}$ is independently hydrogen; $C_{1-4}$alkyl which is unsubstituted or monosubstituted by OH, halogen, CN, $C_{1-4}$-alkoxy or phenyl; or $-COR_{12}E$, $R_{11}$ is OH, $NH_2$, $-NHC_{1-4}$alkyl, $-N(C_{1-4}$alkyl$)_2$, $C_{1-4}$alkyl, $C_{1-4}$-alkoxy, phenyl, or phenoxy which phenyl group of the latter two groups is unsubstituted or substituted by one to three groups selected from $C_{1-4}$alkyl, $C_{1-4}$alkoxy, halogen, COOM and $SO_3M$, $R_{12}$ is $C_{1-6}$alkylene, E is hydrogen, halogen, a protonatable amino group, a quaternary ammonium group, a hydrazinium group, $SO_3M$ or $-OSO_3M$, $R_5$ is hydrogen; $-NR_{14}R_{15}$; a saturated or unsaturated 5- or 6-membered heterocyclic ring containing one or two hetero atoms which is bound by a carbon or nitrogen atom and which is further unsubstituted or substituted by up to three methyl groups or by $NH_2$, $-NHC_{1-4}$alkyl or $-N(C_{1-4}$alkyl$)_2$; $C_{1-6}$alkyl; $C_{2-4}$alkenyl; $C_{2-4}$alkynyl; $C_{1-6}$alkyl monosubstituted by OH, CN, $C_{1-4}$alkoxy, acetamido, $-COR_{16}$, $SO_3M$ or $-OSO_3M$; $C_{5-6}$cycloalkyl; phenyl or phenyl-$C_{1-4}$alkyl which phenyl group of the latter two groups is unsubstituted or substituted by one to three groups selected from $C_{1-4}$alkyl, $C_{1-4}$alkoxy, halogen, $NO_3$, $NH_2$, COOM and $SO_3M$; $C_{1-6}$alkylene-$E_1$;

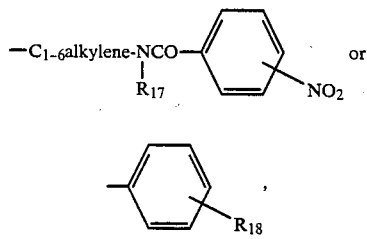

each $R_{14}$ and $R_{15}$ is independently hydrogen; $C_{1-4}$alkyl; $C_{1-4}$alkyl monosubstituted by OH, halogen, CN or $C_{1-4}$alkoxy; phenyl or phenyl substituted by one or two groups selected from halogen, $C_{1-4}$alkyl and $C_{1-4}$alkoxy, $R_{16}$ is OH or $C_{1-4}$alkoxy, $R_{17}$ is hydrogen or $C_{1-4}$alkyl, $E_1$ is a protonatable amino group, a quaternary ammonium group, a hydrazinium group or a group of the formula

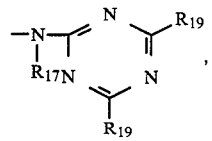

$R_{18}$ is $E_2$, $-NHCOR_{12}E_2$, $-SO_2NHR_{12}E_2$ or $-CONHR_{12}E_2$;

each $R_{19}$ is independently halogen, $NH_2$ or an aliphatic amino group, $E_2$ is a protonatable amino group, a quaternary ammonium group or a hydrazinium group, X is O or NH, Z is OH, $NH_2$, methyl or ethyl, Y is O, S or $N-Y_1$, $Y_1$ is hydrogen; CN; $CONH_2$; $C_{1-4}$alkyl; $C_{1-4}$alkyl monosubstituted by OH, CN, halogen or $C_{1-4}$alkoxy, phenyl or phenyl-$C_{1-4}$alkyl which phenyl group of the latter two groups is unsubstituted or substituted by one or two groups selected from halogen, $C_{1-4}$alkyl, $C_{1-4}$alkoxy, acetamido, COOM and $SO_3M$; 1- or 2-naphthyl; $C_{1-6}$alkylene-$SO_3M$; $C_{1-6}$alkylene-$OSO_3M$ or $C_{1-6}$-alkylene-COOM, each $R_{20}$ and $R_{21}$ is independently hydrogen; $C_{1-4}$alkyl; phenyl or phenyl-$C_{1-4}$alkyl which phenyl group of the latter two groups is unsubstituted or substituted by one or two groups selected from halogen, $C_{1-4}$alkyl, $C_{1-4}$alkoxy, COOM and $SO_3M$; or, provided that Y is n-$Y_1$ where $Y_1$ is hydrogen, one of $R_{20}$ and $R_{21}$ may also have a significance additionally given for $Y_1$;

with the provisos that (i) in a compound of formula I at least one sulphonic acid group is present;

(ii) when in a compound of formula I K is a group (a), at least one of $R_4$ and $R_5$ is hydrogen;

(iii) when in a compound of formula I
 (1) K is a group (b) in which Y is O or S,
 (2) $R_2$ is other than COOM,
 (3) one of $Q_1$ and $Q_2$ or both $Q_1$ and $Q_2$ are $SO_3M_1$,
 and (1) to (3) occur simultaneously, then at least one $M_1$ is a quaternary ammonium cation;

(iv) when in a compound of formula I containing K as a group (b)
 (1) the diazo component radical is defined as follows: $R_1$ is hydrogen, $R_2$ is methyl, $Q_1$ is $SO_3M_1$ in the 7-position, n is O and $Q_2$ is hydrogen,
 (2) each $R_{20}$ and $R_{21}$ is hydrogen,
 (3) Y is $N-Y_1$ in which $Y_1$ is hydrogen, and (1) to (3) occur simultaneously, then $M_1$ has a significance other than hydrogen or sodium;

(v) when in a compound of formula I containing K as a group (b)
 (1) the diazo component radical is defined as follows: $R_1$ is hydrogen, $R_2$ is methyl, $Q_1$ is $SO_3M_1$ in the 7-position, n is O and $Q_2$ is hydrogen,
 (2) X is O and Z is OH,
 (3) each $R_{20}$ and $R_{21}$ is hydrogen,
 (4) Y is $N-Y_1$ in which $Y_1$ is CN or $CONH_2$, and (1) to (4) occur simultaneously, then $M_1$ is a quaternary ammonium cation;

which compound of formula I is in free acid or salt form whereby each sulphonic acid group as well as each protonatable amino group can be present in ionized form.

In a compound of formula I the total number of any basic and/or cationic groups, e.g. any protonatable amino and/or quaternary ammonium groups, equals or is less than the total number of anionic groups, i.e. the sulpho and carboxy groups present. Depending on the reaction and isolation conditions used for a compound of formula I, the positive charge of each cationic group is balanced either by the negative charge of an anionic $SO_3^\ominus$ or $COO^\ominus$ group forming an internal salt, or by an external anion $An^\ominus$, where $An^\ominus$ is a non-chromophoric anion, such as chloride, bromide, lactate, acetate, propionate, citrate, oxalate, methyl sulphate, ethyl sulphate and hydrogensulphate, most preferably chloride.

The term "salt form" encompasses internal and external salt forms as well as acid addition salt form.

In case where a compound of formula I is free of basic and cationic groups, this compound is in free acid or external salt form. Where it is free of basic groups and the total number of cationic groups (a) equals or (b) is less than the total number of anionic groups, normally an internal salt is formed, or both groups may be in external salt form, and for (b) the surplus anionic group(s) is (are) in free acid or external salt form. Where it is free of cationic groups and the total number of basic groups (c) equals or (d) is less than the total number of anionic groups, normally an internal salt is formed and for (d) the surplus anionic group(s) is (are) in free acid or external salt form, or the anionic group may be in external salt form, and the basic group may be in free base or acid addition salt form with an acid HAn, where $An^\ominus$ is a non-chromophoric anion, and the surplus anionic group(s) is (are) in external salt form. In principle, the same applies where both basic groups and cationic groups are present.

In the specification any halogen means flourine, chlorine or bromine, especially chlorine.

Generally, any alkyl or alkylene is linear or branched unless indicated to the contrary.

In any hydroxy-substituted alkyl group which is linked to nitrogen, the hydroxy group is bound to a carbon atom other than to the $C_1$-atom.

$Q_1$ is preferably $SO_3M_1$ which is more preferably bound to the 7-position.

n is preferably O.

Each $R_1$ is preferably $R_{1a}$, where each $R_{1a}$ is independently hydrogen, $C_{1-4}$alkyl, methoxy or ethoxy. More preferably it is $R_{1b}$, where each $R_{1b}$ is independently hydrogen, methyl, ethyl, methoxy or ethoxy. Even more preferably it is $R_{1c}$, where each $R_{1c}$ is independently hydrogen or methyl. Most preferably $R_1$ is hydrogen.

$R_2$ is preferably $R_{2a}$, where $R_{2a}$ is $C_{1-4}$alkyl, $C_{1-4}$alkoxy or COOM. More preferably it is $R_{2b}$, where $R_{2b}$ is methyl, methoxy, ethoxy or COOM. Most preferably $R_2$ is methyl.

$Q_2$, when $SO_3M_1$, is preferably ortho to the azo group.

Preferred are compounds of formula I in which each $R_1$ is $R_{1b}$, where each $R_{1b}$ is independently hydrogen, methyl, ethyl, methoxy or ethoxy; $R_2$ is $R_{2b}$, where $R_{2b}$ is methyl, methoxy, ethoxy or COOM; n is O; and $Q_1$ is $SO_3M_1$ in the 7-position.

Any alkyl or alkoxy as $R_3$ preferably contains 1 or 2 carbon atoms and is most preferably methyl or methoxy. Any substituted alkyl is preferably a $C_{2-3}$alkyl group monosubstituted by hydroxy or $C_{1-2}$alkoxy. Any cycloalkyl is preferably cyclohexyl.

Preferably, in any substituted phenyl or phenylalkyl group, the phenyl group contains one or two groups selected from methyl, methoxy, chlorine, COOM and $SO_3M$.

Any heterocyclic ring as $R_3$ is preferably morpholine, pyrrolidine, piperidine, piperazine or N-methylpiperazine (when saturated) which is bound by a carbon or nitrogen atom, or is pyridine, triazine, pyridazine, pyrimidine or pyrazine (when unsaturated) which is bound by a carbon or nitrogen atom where in the latter case (when bound by a nitrogen atom) a methylene bridge is present.

$R_6$ is preferably $R_{6a}$, where $R_{6a}$ is OH, $NH_2$, methoxy or ethoxy. More preferably it is $R_{6b}$, where $R_{6b}$ is OH or $NH_2$.

$R_7$ is preferably $R_{7a}$, where $R_{7a}$ is CN, chlorine, $SO_3M$,

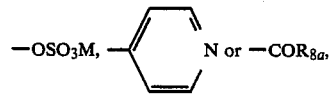

where $R_{8a}$ is OH, $NH_2$, methyl, ethyl, methoxy or ethoxy; more preferably it is $R_{7b}$, where $R_{7b}$ is $SO_3M$,

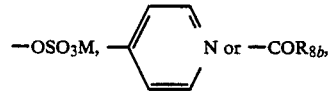

where $R_{8b}$ is OH or $NH_2$.

$R_3$ is preferably $R_{3a}$; where $R_{3a}$ is hydrogen; CN; $NH_2$; OH; methyl; ethyl; hydroxyethyl; $C_{1-2}$alkoxyethyl; methoxy; ethoxy; cyclohexyl; phenyl or phenyl-$C_{1-2}$alkyl in which the phenyl group is unsubstituted or substituted by one or two groups selected from methyl, methoxy, chlorine, COOM and $SO_3M$;

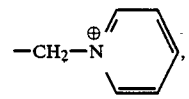

—$COR_{6a}$ or —$(CH_2)_{1-2}R_{7a}$. More preferably $R_3$ is $R_{3b}$, where $R_{3b}$ is $NH_2$, methyl, ethyl, hydroxyethyl, cyclohexyl, phenyl, phenyl-$C_{1-2}$alkyl, —$COR_{6b}$ or —$CH_2R_{7b}$. Even more preferably $R_3$ is $R_{3c}$, where $R_{3c}$ is $NH_2$, methyl, hydroxyethyl, phenyl, phenylethyl or —$CH_2SO_3M$. Even more preferably $R_3$ is $R_{3d}$, where $R_{3d}$ is $NH_2$, methyl or phenyl. Most preferably $R_3$ is methyl.

Any protonatable amino or quaternary ammonium group as E, $E_1$ or $E_2$ is preferably a group B, where B is a primary amino group, a secondary or tertiary aliphatic, cycloaliphatic, aromatic or saturated, unsaturated or partially unsaturated heterocyclic amino group which latter group is attached by the N-atom or a carbon atom; or a quaternary ammonium group corresponding to the above.

Any aliphatic amino group as B is preferably a mono-$C_{1-4}$-alkyl-or a di-($C_{1-4}$alkyl)-amino group. The alkyl group may be monosubstituted by halogen, hydroxy, cyano, $C_{1-4}$alkoxy or phenyl. Any cycloaliphatic amino group is preferably $C_{5-6}$cycloalkylamino, the cycloalkyl group of which is unsubstituted or substituted by one or two $C_{1-2}$alkyl groups.

Any aromatic amino group is preferably phenylamino, the phenyl ring of which is unsubstituted or substituted by one or two groups selected from halogen, $C_{1-4}$alkyl, $C_{1-4}$alkoxy, $SO_3M$ and COOM.

Any heterocyclic amino group as B which is attached by the N-atom or a carbon atom is preferably a saturated, unsaturated or partially unsaturated 5- or 6-membered ring which contains one or two hetero atoms and may be further substituted by one or two $C_{1-4}$alkyl groups.

More preferably B is $B_1$, where $B_1$ is a protonatable amino group —$NR_{22}R_{23}$ or a quaternary ammonium group —$N^{\oplus}R_{24}R_{25}R_{26}$ or $B_1$ forms a protonatable or quaternary 5- or 6-membered saturated heterocyclic ring of the formula

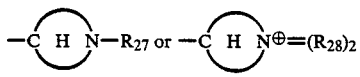

or a corresponding protonatable or quaternary 5- or 6-membered unsaturated or partially unsaturated heterocyclic ring, each of $R_{22}$ and $R_{23}$, independently, is hydrogen $C_{1-4}$alkyl; $C_{2-4}$alkyl monosubstituted by hydroxy, $C_{1-4}$alkoxy, halogen or cyano; or phenyl or phenyl-$C_{1-4}$alkyl, the phenyl group of which is unsubstituted or substituted by one to three groups selected from chlorine, $C_{1-4}$alkyl and $C_{1-4}$alkoxy, or $C_{5-6}$cycloalkyl, or $R_{22}$ or $R_{23}$, together with the N-atom to which they are attached, attached, form a heterocyclic ring of the formula

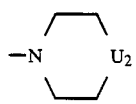

in which
$U_2$ is the direct bond, —$CH_2$—, —O—, —S—, —$SO_2$—, —SO—, —NH—, —$N(C_{1-4}alkyl)$— or —$N^{\oplus}(C_{1-4}alkyl)_2$—,
each of $R_{24}$ and $R_{25}$ has independently one of the non-cyclic significances of $R_{22}$ and $R_{23}$ except hydrogen, and $R_{26}$ is $C_{1-4}$alkyl or phenyl-$C_{1-4}$alkyl, or
$R_{24}$, $R_{25}$ and $R_{26}$, together with the N-atom to which they are attached, form a pyridinium group unsubstituted or substituted by one or two methyl groups, or a ring of the formula

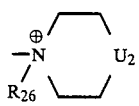

in which $R_{26}$ and $U_2$ are as defined above,
$R_{27}$ is hydrogen or $C_{1-4}$alkyl, and
each $R_{28}$, independently, is $C_{1-4}$alkyl.

Even more preferably B is $B_2$, where $B_2$ is —$NR_{22a}R_{23a}$ or —$N^{\oplus}R_{24a}R_{25a}R_{26a}$,
each of $R_{22a}$ and $R_{23a}$, independently, is hydrogen, $C_{1-2}$alkyl, unbranched hydroxy-$C_{2-3}$alkyl, phenyl or benzyl or both $R_{22a}$ and $R_{23a}$, together with the N-atom to which they are attached, form a pyrrolidine, piperidine, morpholine, piperazine or N-methylpiperazine group, each of $R_{24a}$ and $R_{25a}$ has independently one of the non-cyclic or cyclic significances of $R_{22a}$ or $R_{23a}$ except hydrogen, and $R_{26a}$ is methyl, ethyl or benzyl, or $R_{24a}$, $R_{25a}$ and $R_{26a}$, together with the N-atom to which they are attached, form a pyridinium group unsubstituted or substituted by one or two methyl groups.

Most preferably B is $B_3$, where $B_3$ is —$NR_{22b}R_{23b}$ or —$N^{\oplus}R_{24b}R_{25b}R_{26b}$, each of $R_{22b}$ and $R_{23b}$, is hydrogen, methyl or ethyl or both $R_{22b}$ and $R_{23b}$ together with the N-atom to which they are attached, form a piperidine, morpholine, piperazine or N-methylpiperazine ring;

each of $R_{24b}$ and $R_{25b}$ is methyl or ethyl or both $R_{24b}$ and $R_{25b}$ together with the N-atom to which they are attached, has one of the cyclic significances of $R_{22b}$ and $R_{23b}$, $R_{26b}$ is methyl or ethyl, or $R_{24b}$, $R_{25b}$ and $R_{26b}$ together with the N-atom to which they are attached, form a pyridinium group unsubstituted or substituted by one or two methyl groups.

E is preferably $E_a$, where $E_a$ is hydrogen, chlorine, $B_2$ or $SO_3M$; more preferably it is $E_b$, where $E_b$ is hydrogen, chlorine, a group $B_3$ or $SO_3M$.

Each $R_9$ and $R_{10}$ is preferably $R_{9a}$ and $R_{10a}$, where each of $R_{9a}$ and $R_{10a}$ is independently hydrogen, $C_{1-2}$alkyl, $C_{1-2}$alkyl monosubstituted by OH, $C_{1-2}$alkoxy or phenyl, or —$COR_{12a}E_a$, in which $R_{12a}$ is $C_{1-2}$alkylene. More preferably each of $R_9$ and $R_{10}$ is $R_{9b}$ and $R_{10b}$, where each of $R_{9b}$ and $R_{10b}$ is independently hydrogen, methyl, or —$COR_{12a}E_b$.

$R_{11}$ is preferably $R_{11a}$, where $R_{11a}$ is OH, $NH_2$, —$NHCH_3$, —$N(CH_3)_2$, methyl, ethyl, methoxy or ethoxy. More preferably it is $R_{11b}$, where $R_{11b}$ is $NH_2$, methyl, ethyl, methoxy or ethoxy.

$R_4$ is preferably $R_{4a}$, where $R_{4a}$ is hydrogen; CN; chlorine; bromine, $SO_3M$, —$NR_{9a}R_{10a}$, $C_{1-2}$alkyl, $C_{1-2}$alkyl monosubstituted by OH; phenyl; $SO_3M$ or —$O$-$SO_3M$; —$COR_{11a}$; —$CH_2NHCOR_{12a}B_2$ or a group

forming a pyridine, pyrimidine or benzimidazole ring which is further unsubstituted or monosubstituted by methyl, $NH_2$, —NHCH' or —$N(CH_3)_2$. More preferably $R_4$ is $R_{4b}$, where $R_{4b}$ is hydrogen, CN, —$NHR_{10b}$, —$COR_{11b}$, —$CH_2NHCOCH_2B_3$,

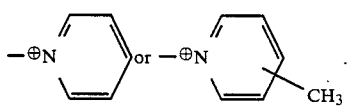

Even more preferably $R_4$ is $R_{4c}$, where $R_{4c}$ is hydrogen, CN, —$NHCOCH_3$, —$COR_{11b}$,

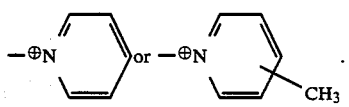

Even more preferably $R_4$ is $R_{4d}$, where $R_{4d}$ is hydrogen, CN, —$COR_{11b}$,

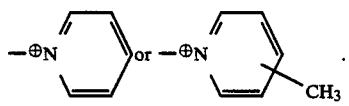

Most preferably $R_4$ is $R_{43}$, where $R_{4e}$ is hydrogen, CN or —$CONH_2$.

It is also preferred that $R_3$ and $R_4$ together with the carbon atoms to which they are attached form part of a further ring which corresponds to the formula

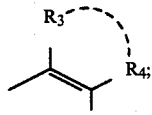

for example a ring of the formula

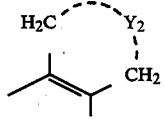

in which $Y_2$ is

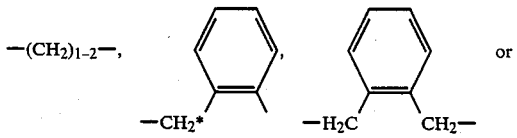

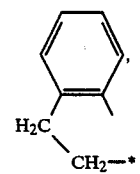

and the starred carbon atom is bound to the —$CH_2$— group in the $R_3$-position.

$R_{14}$ and $R_{15}$ are preferably $R_{14a}$ and $R_{15a}$, where each of $R_{14a}$ and $R_{15a}$ is independently hydrogen, methyl, ethyl or phenyl.

$R_{16}$ is preferably $R_{16a}$, where $R_{16a}$ is OH, methoxy or ethoxy.

$R_{17}$ is preferably $R_{17a}$, where $R_{17a}$ is hydrogen or methyl.

Any aliphatic amino group as $R_{19}$ is preferably a mono-$C_{1-4}$-alkyl-or di-($C_{1-4}$alkyl)-amino group, in which the alkyl groups may be monosubstituted by halogen, OH, CN, $C_{1-4}$alkoxy or phenyl.

Each $R_{19}$ is preferably $R_{19a}$, where each $R_{19a}$ is independently fluorine, chlorine, $NH_2$, —$NHC_{1-2}$alkyl or —$N(C_{1-2}$alkyl$)_2$, in which the alkyl groups are unsubstituted or monosubstituted by OH, CN or $C_{1-2}$alkoxy. More preferably each $R_{19}$ is $R_{19b}$, where each $R_{19b}$ is independently chlorine, $NH_2$, —$NHCH_3$, —$N(CH_3)_2$, —$NHCH_2CH_2OH$ or —$N(CH_2CH_2OH)_2$.

$E_1$ is preferably $E_{1a}$, where $E_{1a}$ is a group $B_1$ or a group of the formula

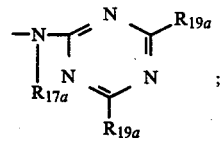

more preferably it is $E_{1b}$, where $E_{1b}$ is a group $B_3$ or a group of the formula

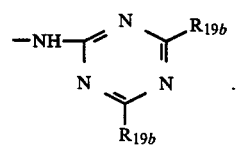

$E_2$ is preferably $E_{2a}$, where $E_{2a}$ is a group $B_2$. More preferably it is $E_{2b}$, where $E_{2b}$ is a group $B_3$.

$R_{18}$ is preferably $R_{18a}$, where $R_{18a}$ is $E_{2a}$, —NH-$COR_{12a}E_{2a}$, —$SO_2NHR_{12a}E_{2a}$ or —$CONHR_{12a}E_{2a}$; more preferably it is $R_{18b}$, where $R_{18b}$ is $E_{2b}$, —NH-$COR_{12a}E_{2b}$ or —$CONHR_{12a}E_{2b}$.

$R_5$ is preferably $R_{5a}$, where $R_{5a}$ is hydrogen; —$NR_{14a}R_{15a}$; phenyl; phenyl-$C_{1-2}$alkyl; cyclohexyl; $C_{1-4}$alkyl; $C_{1-4}$alkyl monosubstituted by OH, CN, $C_{1-2}$alkoxy, —$COR_{16a}$, $SO_3M$ or —$OSO_3M$; —$C_{1-3}$alkylene-$E_{1a}$;

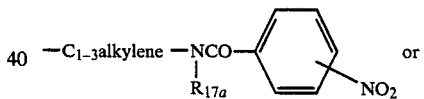

More preferably $R_5$ is $R_{5b}$, where $R_{5b}$ is hydrogen, —$NHR_{15a}$, phenyl, phenyl-$C_{1-2}$alkyl, methyl, ethyl, 2-hydroxyethyl, $C_{1-2}$alkyl monosubstituted by $SO_3M$ or —$COR_{16a}$, —$(CH_2)_{1-3}$-$E_{1b}$, —$(CH_2)_{2-3}$—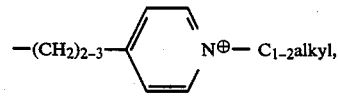

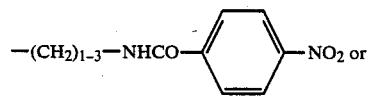

Even more preferably R₅ is R₅c, where R₅c is hydrogen, ethyl, 2-hydroxyethyl

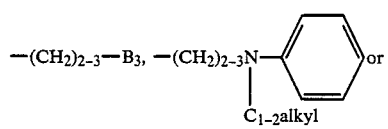

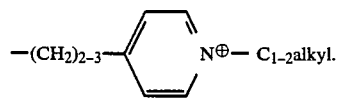

Most preferably R₅ is hydrogen.

X is preferably O.

Z is preferably $Z_a$, where $Z_a$ is OH or NH₂.

Preferably, the phenyl group of any phenyl or phenylalkyl as Y₁ (when substituted) is substituted by one or two groups selected from chlorine, methyl, methoxy, COOM and SO₃M.

Y₁ is preferably $Y_{1a}$, where $Y_{1a}$ is hydrogen, CN, CONH₂, methyl, ethyl, C₂₋₄alkyl monosubstituted by OH, CN, chlorine or C₁₋₂alkoxy; phenyl or phenyl-C₁₋₂alkyl, the phenyl group of the latter two groups is unsubstituted or substituted by one or two groups selected from chlorine, methyl, methoxy, COOM and SO₃M; C₂₋₄alkylene-SO₃M, C₂₋₄alkylene-OSO₃M or C₂₋₄alkylene—COOM. More preferably it is $Y_{1b}$, where $Y_{1b}$ is hydrogen, CN, CONH₂, methyl, ethyl, 2-hydroxyethyl, phenyl, phenyl-C₁₋₂alkyl, C₂₋₄alkylene-SO₃M or C₂₋₄alkylene—COOM. Even more preferably it is $Y_{1d}$, where $Y_{1d}$ is hydrogen, CN or CONH₂. More preferably it is $Y_{1d}$, where $Y_{1d}$ is hydrogen or CN, of which hydrogen is most preferred.

Y is preferably $Y_a$, where $Y_a$ is O or N—$Y_{1a}$; more preferably it is $Y_b$, where $Y_b$ is O or N—$Y_{1b}$; even more preferably it is $Y_c$, where $Y_c$ is O or N—$Y_{1c}$; most preferably it is $Y_d$, where $Y_d$ is O or N—$Y_{1d}$.

Each R₂₀ and R₂₁ is preferably R₂₀ₐ and R₂₁ₐ, where each R₂₀ₐ and R₂₁ₐ is independently hydrogen, methyl, ethyl, phenyl-C₁₋₂ alkyl or phenyl, the phenyl groups of which are unsubstituted or substituted by one or two groups selected from chlorine, methyl, methoxy, COOM and SO₃M, or in case where Y is N—Y₁ in which Y₁ is hydrogen, one of R₂₀ₐ and R₂₁ₐ has a significance additionally given for Y₁ₐ. More preferably each of R₂₀ and R₂₁ is R₂₀ᵦ and R₂₁ᵦ, where each R₂₀ᵦ and R₂₁ᵦ is independently hydrogen, methyl, ethyl, phenyl or benzyl or in case where Y is N—Y₁ in which Y₁ is hydrogen, one of R₂₀ᵦ and R₂₁ᵦ has a significance additionally given for Y₁ᵦ. Most preferably R₂₀ and R₂₁ are hydrogen.

The group (a) is preferably (a₁) of the formula

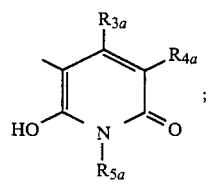 (a₁)

more preferably (a₂) of the formula

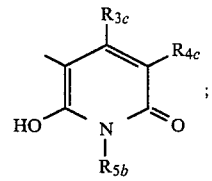 (a₂)

even more preferably (a₃) of the formula

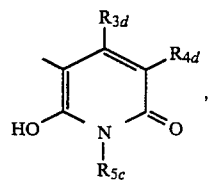 (a₃)

most preferably (a₄), where (a₄) is a group (a₃) in which R₃d is methyl, R₄d is R₄e and R₅c is hydrogen.

The group (b) is preferably (b₁) of the formula

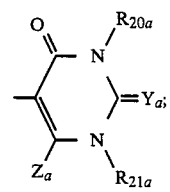 (b₁)

more preferably it is (b₂) of the formula

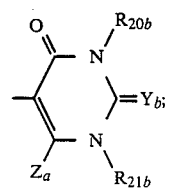 (b₂)

most preferably it is (b₃) of the formula

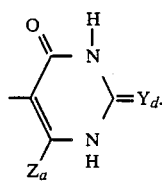

K is preferably K₁, where K₁ is one of the groups (a₁) or (b₁). More preferably it is K₂, where K₂ is one of the groups (a₂) or (b₂). Even more preferably it is K₃, where K₃ is one of the groups (a₃) or (b₃). Most preferably K is K₄, where K₄ is a group (a₃), and especially a group (a₄).

Preferred compounds of formula I are those in which K is a group (a). More preferred are those in which K is a group (a₃). Most preferred compounds of formula I are those in which K is a group (a₄).

Also preferred are compounds of formula I in which R₂ is COOM, and K is a group (b); more preferred are those in which K is a group (b₂), most preferably K is a group

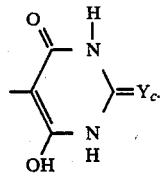

A compound of formula I is in free acid form, in alkali metal or unsubstituted or substituted ammonium salt form or in mixed salt form, or may form an internal salt. Any substituted ammonium cation present as M or $M_1$ may be derived from a primary, secondary or tertiary amine. For example, the following amines are suitable:—mono-, di- or trimethyl-, -ethyl-; -propyl- or -butyl-amine; mono-; di- or triethanol-; -propanol- or isopropanol-amine; N-methyl-N-hydroxyethylamine, N-methyl-N,N-di-(hydroxyethyl)amine, N-ethyl-N-hydroxyethoxyethylamine, morpholine; piperidine, piperazine; hydroxyethylmorpholine; hydroxyethylpiperazine, aminoethylpiperazine; ethylenediamine, hexamethylenediamine; dimethylaminopropylamine, diethylaminopropylamine; diethylene glycol amine; diglycol amine and 3-methoxypropylamine.

Also suitable as amines are polyglycol amines. They can be prepared for example by reacting ammonia or an alkylamine or hydroxyalkylamine with alkylene oxides.

Any substituted ammonium ion may also be a quaternary ammonium ion (especially when $M_1$) derived from ammonium compounds which preferably contain one or two quaternary ammonium ions. Examples are tetramethyl-, tetraethyl-, trimethylethyl-, benzyldiethylmethyl-, trimethylphenyl-, trimethylbenzyl-, triethylcyclohexyl-, trimethylhydroxyethyl- and tetrahydroxyethyl- ammoniumhydroxide as well as N,N-dimethylpiperidinium hydroxide, or compounds corresponding to the formula

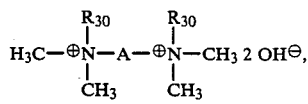

in which each $R_{30}$ is independently methyl, ethyl, hydroxyethyl or 2- or 3-hydroxypropyl and A is $C_{1-4}$alkylene or —CH$_2$CH$_2$N(CH$_3$)CH$_2$CH$_2$—.

Preferred compounds correspond to formula Ia

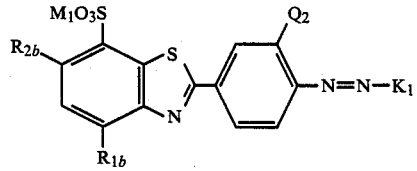

in which $R_{1b}$, $R_{2b}$, $Q_2$, $M_1$ and $K_1$ are as defined above with the provisos that
(ii) when in a compound of formula Ia $K_1$ is a group (a$_1$), at least one of $R_{4a}$ and $R_{5a}$ is hydrogen;
(iii) when in a compound of formula Ia
  (1) $K_1$ is a group (b$_1$) in which $Y_a$ is O,
  (2) $R_{2b}$ is other than COOM,
  (3) $Q_2$ is hydrogen or SO$_3$M$_1$, and (1) to (3) occur simultaneously, then at least one of $M_1$ is a quaternary ammonium cation;

(iv) when in a compound of formula Ia in which $K_1$ is a group (b$_1$)
  (1) the diazo component radical is defined as follows:—$R_{1b}$ is hydrogen, $R_{2b}$ is methyl and $Q_2$ is hydrogen,
  (2) each $R_{20a}$ and $R_{21a}$ is hydrogen,
  (3) $Y_a$ is N—$Y_{1a}$ in which $Y_{1a}$ is hydrogen, and (1) to (3) occur simultaneously, then $M_1$ has a significance other than hydrogen or sodium;

(v) when in a compound of formula Ia in which $K_1$ is a group (b$_1$)
  (1) the diazo component radical is defined as follows—$R_{1b}$ is hydrogen, $R_{2b}$ is methyl and $Q_2$ is hydrogen,
  (2) $Z_a$ is OH,
  (3) each $R_{20a}$ and $R_{21a}$ is hydrogen,
  (4) $Y_a$ is N—$Y_{1a}$ in which $Y_{1a}$ is CN or CONH$_2$, and (1) to (4) occur simultaneously, then $M_1$ is a quaternary ammonium cation.

Even more preferred are compounds of formula Ia in which
(1) $K_1$ $K_2$;
(2) $K_1$ is $K_3$;
(3) $R_{1b}$ is $R_{1c}$;
(4) $R_{1b}$ is hydrogen;
(5) $R_{2b}$ is methyl;
(6) those of 2) to 5), in which $K_1$ is $K_4$.

The compounds of formula I can be prepared in accordance with known methods reacting the diazonium salt of an amine of formula II,

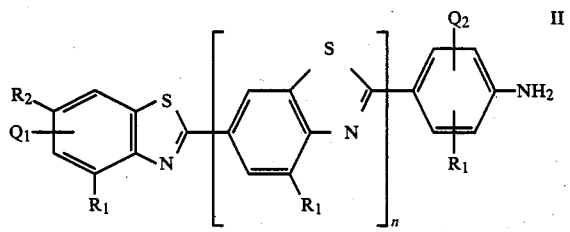

in which $R_1$, $R_2$, $Q_1$, $Q_2$ and n are as defined above, or a mixture thereof with a compound which in one of the possible tautomeric forms corresponds to formula IIIa or IIIb,

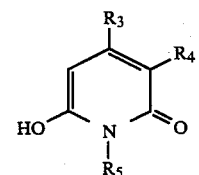

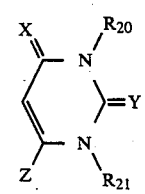

in which $R_3$, $R_4$, $R_5$, $R_{20}$, $R_{21}$, X, Y and Z are as defined above.

The starting compounds of formula II, diazo components of the 2-phenylbenzothiazole series, are either known or may be prepared analogously to known processes, for example according to M. Schubert, Annalen 558, 10 (1947). Diazo components of formula II for example are as follows:

2-(4'-aminophenyl)-6-methylbenzothiazole-7-sulfonic acid
2-(4'-aminophenyl)-6-methylbenzothiazole-5-sulfonic acid
2-(4'-aminophenyl)-6-methylbenzothiazole-3',7-disulfonic acid
2-(4'-aminophenyl)-6-carboxybenzothiazole-7-sulfonic acid
2-(4'-amino-3'-methyl-5'-sulphophenyl)-4,6-dimethylbenzothiazole-7-sulphonic acid
2-(4'-amino-3'-methylphenyl)-4,6-dimethylbenzothiazole-7-sulphonic acid
2-(4'-aminophenyl)-6-methylbenzothiazole primuline base.

The coupling components, of formula IIIa are either known or may be prepared in accordance with known methods. Such preparation processes for example are described in: The Chemistry of Heterocyclic Compounds, Pyridine and its Derivatives, Parts I-IV; Interscience Publishers Inc. 1960-1964; furthermore in: Berichte der Deutschen Chemischen Gesselschaft 29, (1986), page 655; and in patent references, such as DE-OS 19 64 690; 20 22 817; 21 18 945; 21 23 061; 21 41 449; 21 50 598; 21 50 772; 21 50 817; 21 62 612; 23 49 709; 27 05 562; etc.

Compounds of formula IIIax,

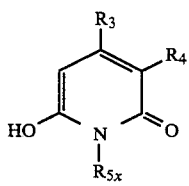

IIIax in which $R_{5x}$ is $C_{1-6}$alkylene-$E_1$ or the group

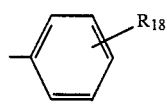

may be prepared for example by reacting a compound of formula IIIay,

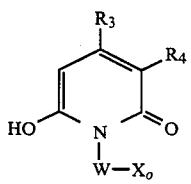

IIIay in which W is $C_{1-6}$alkylene or a group

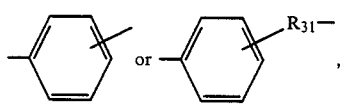

wherein $R_{31}$ is —NHCOR$_{12}$—, —SO$_2$NHR$_{12}$— or —CONHR$_{12}$—, and $X_o$ is a functional group, preferably a group which can be split off as an anion, with a compound of the formula $E_1$-H.

The coupling components, of formula IIIb are either known or may be prepared in accordance with known methods from known starting compounds. Such preparation processes for example are described in: The Chemistry of Heterocyclic Compounds, The Pyrimidines, Interscience Publishers 1962; furthermore in numerous patent references such as U.S. Pat. No. 2,673,204 or DE-PS 134,984, 158,591, 165,692, 184,456, etc.

Diazotisation and coupling reactions may be effected in accordance with known methods. For diazotisation, the amines or amine mixtures are advantageously dissolved in an aqueous alkali or made into a paste therein, and mixed with a 5-10% molar excess sodium nitrite. Diazotisation conveniently is carried out in a medium containing a mineral acid, preferably hydrochloric acid, at 0°-20° C. Coupling conveniently is carried out at pH 3-10, preferably 4-8. Optionally, a quaternary ammonium compound is added using at least an equimolar amount which is sufficient to neutralise one sulphonic acid group.

The resultant compound of formula I may be used in form of the solution as obtained; however, this solution may also be converted into a solid by spray-drying. Furthermore, the conventional method of isolation used for dyestuffs, salting out of the solution, filtering off and drying, is also suitable.

The type of cations present in a compound of formula I may be influenced in different ways depending on the preparation process. One possibility consists in filtering off the diazonium salt which is obtained in the above process, and washing it with water. The solid diazonium compound is then added to an aqueous slurry or solution of the coupling component, which contains a basic salt, lithium, sodium, potassium, ammonium hydroxide, one or more organic amines or a quaternary ammonium compound. Anothermethod consists in converting the compound of formula I, which is obtained by diazotisation and coupling and is isolated in the sodium salt form, into the free acid by using a mineral acid, preferably hydrochloric acid, then filtering and washing with water; the compound is subsequently neutralised and thus converted into the desired alkali salt or ammonium salt. Any type of mixed salt form may be obtained by effecting partial conversion into the free acid and/or by step-wise neutralisation. The salt-changing method, conversion of one salt form into another, can also be used.

If diazotisation takes place using alkyl nitrites, dinitrogen trioxide or mixtures of nitric oxide and oxygen instead of alkali nitrite, it is possible to produce solutions of the end products which are free from metal ions. If desired, corresponding salts may be obtained by adding a base which yields cations or by adding an amine.

The compounds according to the invention in form of their water-soluble salts are useful for dyeing or printing hydroxy group- or nitrogen-containing organic substrates. For example, they are suitable for dyeing or printing fibres, threads or textiles produced therefrom, which consist of or contain cellulose materials, such as cotton, in accordance with known methods; cotton is preferably dyed by the exhaust method, for example from a long or short liquor, at room temperature to boiling temperatures. Printing is effected by means of impregnation with a printing paste which is prepared by known methods. The compounds of formula I are especially suited for dyeing or printing paper in accordance with known methods, e.g. for the preparation of sized or unsized paper dyed in the stock. They may also be used for dyeing paper by the dipping process. Furthermore, the new dyestuffs can be used for dyeing or printing leather, preferably chrometanned types of leather, in accordance with known methods. The dyeings and prints obtained (especially those on paper) have good fastness to usage.

The compounds of formula I may be used as such or may also be used in the form of dyeing preparations, which are preferably used for dyeing paper. Suitable liquid, preferably aqueous, concentrated dyeing preparations may be made in accordance with known methods, advantageously by dissolving in suitable solvents, optionally adding an adjuvant, e.g. a hydrotropic compound or a stabiliser. The ability to produce such stable, aqueous-concentrated preparations in the course of dyestuff synthesis without intermediate isolation of the dyestuff is particularly advantageous. In this process, coupling takes place for example in the presence of appropriate amines and in particular in the presence of quaternary ammonium hydroxides which serve to introduce corresponding cations as defined above, and optionally in the presence of further hydrotropic adjuvants. Suitable hydrotropic adjuvants are for example low molecular weight amides, lactones, alcohols, glycols or polyols, low molecular weight ethers or hydroxyalkylation products, as well as nitriles or esters; among these the following compounds are preferably used:—Methanol, ethanol, propanol; ethylene-, propylene-, diethylene-, thiodiethylene- and dipropylene-glycol; butanediol; β-hydroxypropionitrile, pentamethylene glycol, ethylene gycol monoethyl- and -propylether, ethylene diglycol monoethylether, triethylene glycol monobutylether, butyl polyglycol, formamide, dimethylformamide, pyrrolidone, N-methylpyrrolidone, glycol acetate, butyrolactone, urea and ε-caprolactam.

Hydrotropic compounds are described e.g. by H. Rath and S. Müller, in Melliand Textilberichte 40, 707 (1959) or by E. H. Daruwalla in K. Venkataraman, The Chemistry of Synthetic Dyes, Vol. VIII, pages 86–92 (1974).

The additional content of a hydrotropic compound further improves the stability on storage of the dyestuff preparation and the solubility of the dyestuff employed.

An example of a suitable liquid dye preparation (all parts are by weight):
100 parts of a compound of formula I in water-soluble salt form
1-100, preferably 1-10, parts of an inorganic salt, 100–800 parts of water,
0-500 parts of one of the hydrotropic compounds mentioned above.

Depending on the salt form used, the liquid dye preparation may be a suspension or is preferably a true solution. The preparations are stable and can be stored for a long period of time.

Similarly, the compounds of formula I may be made into solid, preferably granulated, dyeing preparations in accordance with known methods, advantageously by granulating as described in French patent specification No. 1.581.900.

A suitable granulate preparation comprises (all parts are by weight):
100 parts of a compound of formula I in water-soluble salt form,
1-100, preferably 1-10, parts of an inorganic salt,
0-800 parts of a standardising agent (preferably non-ionic, such as starch, dextrin, sugar, glucose and urea).

The solid preparation may contain up to 10% residual moisture.

Depending on the cation mixture present, the dyestuffs of formula I possess good solubility properties, particularly good solubility in cold water. Furthermore, when used in paper-making, they colour the waste water only to a slight extent or not at all. They do not mottle on paper and are substantially insensitive to filling material and pH over wide ranges. They are only slightly inclined to give two-sided dyeing on paper. The dyeings on paper have good light fastness properties; after a long-term exposure to light, the shade alters tone-in-tone. The dyed papers also have very good wet fastness properties; they are fast not only to water, but also to milk, fruit juices, sweetened mineral water and tonic water, and in addition they show good alcohol fastness properties.

The dyestuffs have good substantivity, i.e. they exhaust practically quantitatively, and show good build-up; they can be added to the paper pulp directly, i.e. without previously dissolving, as a dry powder or granulate, without reducing the brilliance or the yield of colour. It is advantageous to use the genuine solutions of the dyestuffs as given above, which are stable, of low viscosity and thus capable of being accurately measured out. Fibre materials which contain mechanical wood pulp are dyed in good, even quality with the dyestuffs of the present invention. The dyed paper, is both oxidatively and reductively bleachable, which is important for the recycling of waste paper.

The entire specification of grandparent application Ser. No. 877,659, filed May 19, 1986, particularly pages 1–17 and 44–60, is hereby incorporated be reference.

The following examples further serve to illustrate the invention. In the examples, all parts are by weight or volume, and the percentages are by weight; the temperatures are given in degrees centigrade.

Example 1

6.4 Parts of 2-(4'-aminophenyl)-6-methylbenzothiazole-7-sulphonic acid are stirred into 100 parts of water, and dissolved by adding 5.1 parts of 30% sodium hydroxide solution. 6 Parts of 4N sodium nitrite solution are added, and the solution is poured whilst stirring into a preparation of 200 parts of ice and 7 parts of 30% hydrochloric acid. A yellow diazo suspension is obtained. After stirring for three hours, whereby the temperature may increase to 20°, and excess nitrous acid is decomposed by adding a small amount of sulphamic acid. Then, 3.3 parts of 4-methyl-6-hydroxypyridone-(2) are added to the diazo suspension, and 10 parts of sodium carbonate are subsequently sprinkled in. Coupling commences immediately whereby an orange suspension is obtained. After about one hour coupling is complete. 10 parts of 30% sodium hydroxide solution are added, and the dyestuff thus formed goes totally into solution. By sprinkling in 20% by volume of sodium chloride, the dyestuff can be completely salted out. After drying, the dyestuff corresponding to the formula

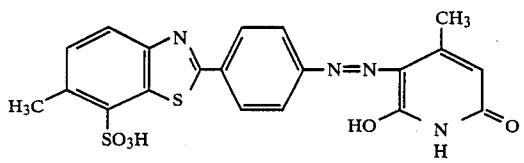

is obtained in form of a powder. It dyes paper a brilliant neutral-yellow shade. The paper dyeings have very good light and wet fastness properties.

Examples 2 to 25 / Table 1

By a method analogous to that of Example 1 further heterocyclic monoazo compounds can be prepared from appropriate starting compounds. They correspond to formula (A),

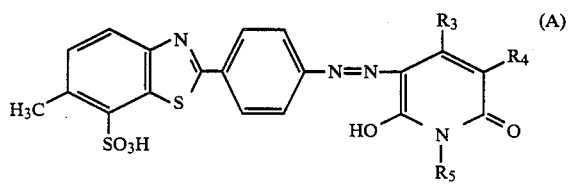

in which the symbols are defined in Table 1 below.

In the last column of this Table 1 and also of the following Tables 2 and 3 the shade of the obtained paper dyeings is given whereby
a is neutral-yellow, b is reddish-yellow and
c is orange.

The paper dyeings made with the dyestuffs in Tables 1 to 3 in conventional manner have good light and wet fastness properties.

The positive charge of each cationic group present in a compound of formula (A), (B) or (C) listed in Tables 1 to 3 is balanced by the negative charge of the $SO_3^{\ominus}$ group. Each protonatable amino group present forms an internal salt with the sulpho group. Where no cationic or protonatable amino group is present or where the total number of anionic groups is greater than the total number of cationic or basic groups, the anionic group(s) is (are) in external salt form, especially in sodium salt form.

TABLE 1

Compounds of formula A

| Ex. No. | $R_3$ | $R_4$ | $R_5$ | shade on paper |
|---|---|---|---|---|
| 2 | $CH_3$ | CN | H | c |
| 3 | —C$_6$H$_5$ | CN | H | c |
| 4 | —CH$_2$SO$_3$H | CN | H | c |
| 5 | " | H | H | b |
| 6 | $CH_3$ | —CONH$_2$ | H | b |
| 7 | " | —COCH$_3$ | H | b |
| 8 | " | H | —CH$_2$CH$_3$ | a |
| 9 | —NH$_2$ | CN | H | a |
| 10 | " | —CONH$_2$ | H | a |
| 11 | " | —COOC$_2$H$_5$ | H | a |
| 12 | $CH_3$ | —N$^{\oplus}$(pyridinium) | H | c |
| 13 | " | —N$^{\oplus}$(4-methylpyridinium) | H | c |
| 14 | OH | H | H | c |
| 15 | —COOH | H | H | b |
| 16 | $CH_3$ | —NHCOCH$_3$ | H | a |
| 17 | —C$_6$H$_5$ | H | H | a |
| 18 | $CH_3$ | H | —(CH$_2$)$_3$N(CH$_3$)$_2$ | a |

TABLE 1-continued

Compounds of formula A

| Ex. No. | R₃ | R₄ | R₅ | shade on paper |
|---|---|---|---|---|
| 19 | " | H | 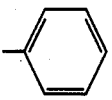 | a |
| 20 | —CH₂CH₂—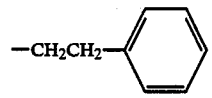 | CN | H | c |
| 21 | —CH₂—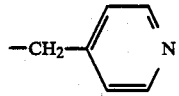 | CN | H | c |
| 22 | —OCH₃ | H | —(CH₂)₂N(C₂H₅)₂ | a |
| 23 | 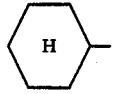 | CN | H | c |
| 24 | CH₃ | H | —CH₂CH₂N(CH₃)₃ $^{\oplus}$ | a |
| 25 | " | H | —CH₂CH₂N(CH₃)—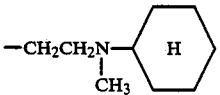 | a |

Example 26

12 Parts of 2-(4'-amino-3'-sulphophenyl)-6-methyl-benzothiazole-7-sulphonic acid are dissolved in 200 parts of water. 100 Parts of ice are added, followed by 7.5 parts of 30% hydrochloric acid. Subsequently, at 0° 8 parts of 4N sodium nitrite solution are added dropwise. A yellow diazo solution is obtained which is stirred for two hours. 8 Parts of 6-hydroxy-4-methyl-pyridonyl-(3)-pyridinium chloride are then added. The pH is adjusted to 8 by adding 20 parts of sodium carbonate. Coupling commences immediately, and an orange suspension is formed. This suspension is stirred for four hours; afterwards the precipitated dyestuff is filtered off. After drying, a readily soluble dyestuff powder containing the dyestuff which, in the possible tautomeric forms, corresponds to one of the given formulae, is obtained.

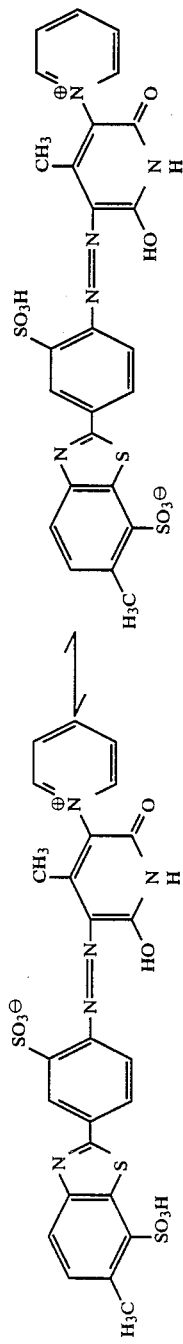

This dyestuff dyes paper a brilliant reddish-yellow shade. The paper dyeings obtained have good light and wet fastness properties.

Examples 27 to 34 / Table 2

By a method analogous to that of Example 26 further compounds may be prepared using appropriate starting compounds. They correspond to formula

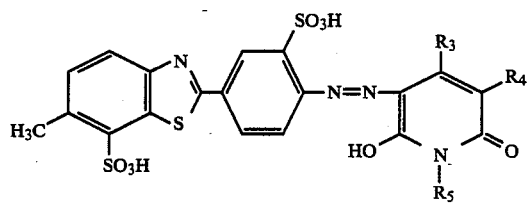

in which the symbols are defined in Table 2 below.

TABLE 2

| | Compounds of formula B | | | |
|---|---|---|---|---|
| Ex. No. | $R_3$ | $R_4$ | $R_5$ | shade on paper |
| 27 | $CH_3$ | H | H | a |
| 28 | " | CN | H | c |
| 29 | " | (3-methylpyridinium) | H | b |
| 30 | " | (4-dimethylaminopyridinium) | H | c |
| 31 | $-NH_2$ | CN | H | b |
| 32 | $CH_3$ | H | $-CH_2CH_2-N^⊕(pyridinium)$ | a |
| 33 | " | H | $-CH_2CH_3$ | a |
| 34 | " | H | $-CH_2CH_2NH_2$ | a |

EXAMPLE 35

7 Parts of 2-(4'-aminophenyl)-6-carboxybenzothiazole-7-sulphonic acid are stirred into 40 parts of water and dissolved with 4 parts of 30% sodium hydroxide solution. 5.5 Parts of 4N sodium nitrite solution are added, and this mixture is poured into a preparation consisting of 100 parts of ice and 10 parts of 30 % hydrochloric acid whilst stirring. A light yellow diazo suspension is formed.

After stirring for one hour, the excess nitrous acid is decomposed by adding sulphamic acid. 4 Parts of 4-amino-3-cyano-6-hydroxypyridone-(2) are added, and then 10 parts of sodium carbonate are sprinkled in. Coupling commences, and a brownish-orange suspension is obtained. After two hours coupling is complete. Subsequently, 20 parts of 30% sodium hydroxide solution are added dropwise, and the mixture is heated to 70°; the resultant dyestuff thus goes into solution. It is salted out by sprinkling in 40 parts of sodium chloride, filtered off and dried. An orange-red powder is obtained which contains the dyestuff having the formula

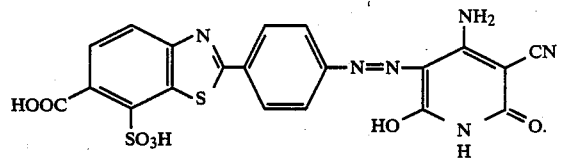

This dyestuff dyes paper a brilliant reddish-yellow shade. The obtained paper dyeings show notably good light and wet fastness properties.

EXAMPLES 36 TO 46/TABLE 3

By a method analogous to that described in Example 35 further compounds can be prepared from appropriate starting compounds. They correspond to the formula

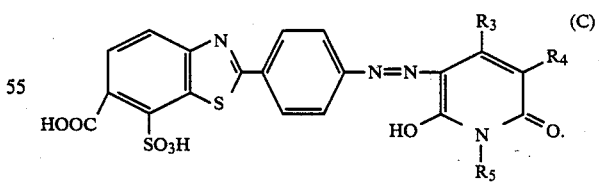

in which the symbols are defined in Table 3 below.

TABLE 3

| | Compounds of formula C | | | |
|---|---|---|---|---|
| Ex. No. | $R_3$ | $R_4$ | $R_5$ | shade on paper |
| 36 | $CH_3$ | H | H | b |
| 37 | " | CN | H | c |

TABLE 3-continued

| | | Compounds of formula C | | |
|---|---|---|---|---|
| Ex. No. | R$_3$ | R$_4$ | R$_5$ | shade on paper |
| 38 | " | —CONH$_2$ | H | b |
| 39 | " | H | —CH$_2$CH$_3$ | b |
| 40 | " | —N$^⊕$(pyridinium) | H | c |
| 41 | " | —N$^⊕$(methylpyridinium) | H | c |
| 42 | " | —COCH$_3$ | H | b |
| 43 | " | H | —CH$_2$CH$_2$OH | a |
| 44 | " | H | —CH$_2$CH$_2$N(CH$_3$)(phenyl) | a |
| 45 | " | H | —(CH$_2$)$_3$N(CH$_3$)$_2$ | a |
| 46 | " | H | —(CH$_2$)$_3$N$^⊕$(CH$_3$)$_3$ | a |

In accordance with the reaction and isolation conditions as described the compounds of Examples 1 to 46 are obtained in sodium salt form provided that no internal salt is formed. They may, depending on the reaction and isolation conditions, or by reacting the sodium salts in accordance with known methods also be obtained in free acid form or in other salt forms containing one or more cations indicated in the description.

EXAMPLE 47

6.4 Parts 2-(4'-aminophenyl)-6-methylbenzothiazole-7-sulphonic acid are diazotised in accordance with the method described in Example 1. The mixture is stirred for three hours and then filtered. The well-pressed filter cake is made into a paste in ice water; this paste is adjusted to 40 parts with ice water. 3.3 Parts of 4-methyl-6-hydroxypyridone-(2) are added followed by 8 parts of triethanolamine. Coupling commences whereby an orange-red mixture is obtained. During coupling, a further 30 parts of ice are added portionwise. After one hour 8 parts of urea are added; then the mixture is heated to 50° whereby a solution is obtained. This solution is ready for use, it contains the dyestuff of Example 1 in triethanolammonium salt form.

EXAMPLE 48

The dyestuff prepared according to the method given in Example 1 is stirred into 200 parts of water prior to drying and is mixed with 20 parts of 30% hydrochloric acid. After the mixture is stirred for a longer time, the dyestuff in the free acid form is filtered off and is added into a mixture consisting of 8 parts of diglycol amine and 5 parts ethylene glycol. The dyestuff dissolves whilst releasing heat. This solution is adjusted to 90 parts by adding water to give a dyestuff solution which is storage-stable and ready for use.

EXAMPLE 49

If in Example 48, 2 parts of monoethanolamine and 15 parts of urea are used instead of a mixture of diglycol amine and ethylene glycol a liquid dyestuff preparation which is stable on storage and has good dyeing properties is obtained.

Also suitable amines instead of monoethanolamine are diethanolamine, monoisopropanolamine and diisopropanolamine.

EXAMPLE 50

If in Example 47, 5 parts of tetramethylammonium hydroxide are used instead of triethanolamine a liquid dyestuff preparation is obtained which is ready for use. By employing tetramethylammonium hydroxide there is no need for adding a further solubilising agent.

Instead of tetramethylammonium hydroxide equimolar amounts of the following quaternary ammonium hydroxides may be used to produce liquid storage-stable preparations of the dyestuff of Example 1.

EXAMPLES 50a TO 50x

| | |
|---|---|
| $\overset{⊕}{N}(C_2H_5)_4$ OH$^⊖$ | 50a |
| $\overset{⊕}{N}(CH_3)_3$ OH$^⊖$ \| CH$_2$CH$_3$ | 50b |
| C$_4$H$_9$ \| $^⊕N(CH_3)_3$ OH$^⊖$ | 50c |

-continued

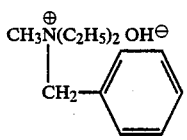 50d

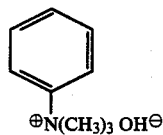 50e

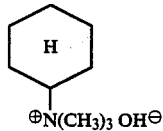 93f

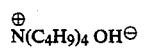 59g

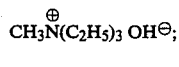 50h

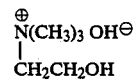 93i

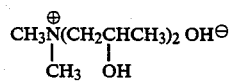 50j

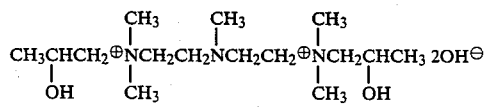 50k

 50l

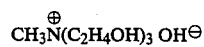 50m

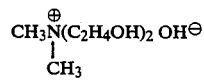 50n

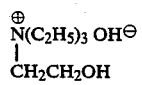 93o

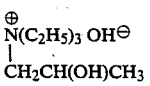 50p

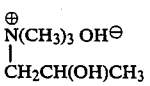 50q

-continued

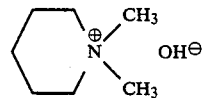 93r

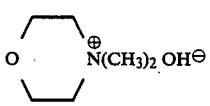 50s

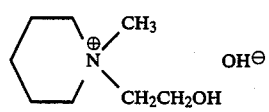 50t

 50u

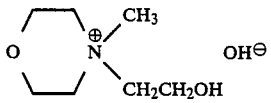 50v

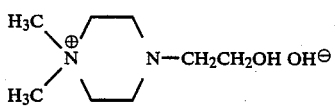 50w

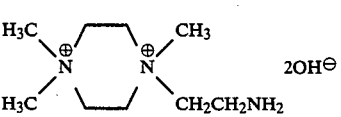 50x

EXAMPLE 51

If lithium hydroxide solution is used instead of the amine or amine mixture employed in one of Examples 47 to 50, a liquid aqueous dye preparation is obtained which contains the dyestuff according to Example 1 in lithium salt form.

By a method analogous to that described in one of Examples 47 to 51 the dyestuffs of Examples 2 to 46 may also be converted into liquid aqueous dyeing preparations showing high stability on storage.

EXAMPLE 52

A mixture consisting of 9.5 parts of primuline base, 1.4 parts of potassium hydroxide, 40 parts of water and 4.3 parts 5N sodium nitrite solution is added to a mixture of 5 parts of hydrochloric acid and 20 parts of ice whilst stirring. Stirring is effected for a further two hours at 20°. The diazonium salt which precipitates is filtered off and washed with water. The diazonium salt together with 3 parts of 4-methyl-6-hydroxypyridone-(2) is suspended in a small quantity of water. To this suspension a 10% lithium hydroxide solution is added to adjust the pH to 8. After stirring for one hour, 20 parts of urea are added. The solution thus obtained is ready for use; it contains the dyestuff of the formula

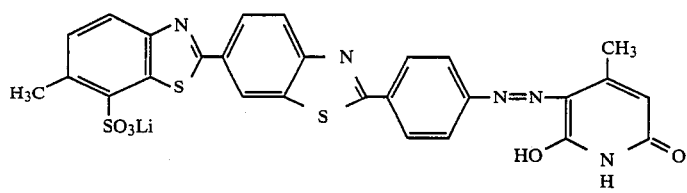

which has notably good properties with respect to substantivity. This dyestuff solution dyes paper a brilliant golden-yellow shade.

EXAMPLE 53

6.4 Parts of 2-(4'-aminophenyl)-6-methylbenzothiazole-7-sulphonic acid are stirred into 100 parts of water and dissolved by adding 5.1 parts of 30% sodium hydroxide solution. To this solution 6 parts of 4N sodium nitrite solution are added, and the resultant mixture is poured into a preparation consisting of 200 parts of ice and 7 parts of 30% hydrochloric acid. A yellow diazo suspension is obtained. After stirring for three hours any excess nitrous acid is decomposed by the addition of a small quantitiy of sulphamic acid. The precipitate thus formed which contains the diazonium salt of the above-mentioned amino compound is filtered off and washed with water until it is acid-free. This diazonium salt together with 2.7 parts of 2,4-diamino-6-hydroxypyrimidine is suspended in a small amount of water; then 20 parts of diethylene glycol amine are added. Coupling commences whereby an orange-coloured mass is produced. After coupling is complete, 10 parts of ethylene glycol and 20 parts of urea are added followed by the addition of water to adjust to a volume of 140 parts. The mixture is heated to 40°, and a clear dyestuff solution of low viscosity is formed. This dyeing preparation is ready for use and storage-stable for several months. It contains the dyestuff in the salt form corresponding to the formula

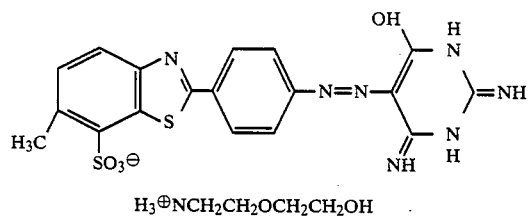

H$_3$⊕NCH$_2$CH$_2$OCH$_2$CH$_2$OH

This dyestuff dyes paper a brilliant neutral-yellow shade. The paper dyeings have very good wet fastness properties. The back water of these dyeings is approximately colourless.

EXAMPLE 54

6.4 Parts of 2-(4'-aminophenyl)-6-methylbenzothiazole-7-sulphonic acid are diazotised according to the method given in Example 53 and coupled with 2,4-diamino-6-hydroxypyrimidine in the presence of sodium carbonate. Then 15 parts of 30% hydrochloric acid are added. Stirring is effected for three hours at 40°. The precipitate is filtered off and washed with water until it is acid-free. The press cake thus obtained is added to a preparation consisting of 30 parts of water and 30 parts of dimethylaminopropylamine. A clear dyestuff solution is obtained which is stable on storage for several months. It contains the dyestuff in the probable salt form corresponding to the formula

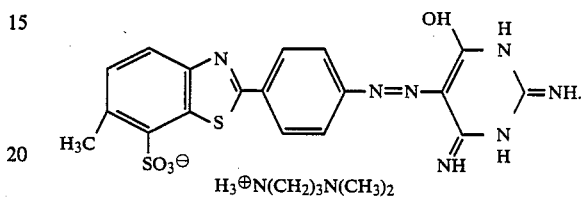

H$_3$⊕N(CH$_2$)$_3$N(CH$_3$)$_2$ which dyes paper a brilliant neutral-yellow shade.

EXAMPLE 55

6.4 Parts of 2-(4'-aminophenyl)-6-methylbenzothiazole-7-sulphonic acid are diazotised according to the method described in Example 53 and coupled with 3.3 parts of 2-cyanimino-4-amino-6-hydroxypyrimidine in the presence of sodium carbonate. The suspension thus obtained is filtered, and the residue is dried. The dyestuff corresponding to the formula

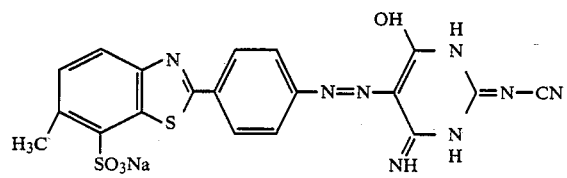

is obtained in powder form. It dyes paper a brilliant reddish-yellow shade. The paper dyeings have notably good wet fastness properties; the back water is colourless.

EXAMPLE 56

7 Parts of 2-(4'-aminophenyl)-6-carboxybenzothiazole-7-sulphonic acid are diazotised according to the method described in Example 53. To the resultant diazonium salt 2.7 parts of 2,4-diamino-6-hydroxypyrimidine are added, and coupling is effected in the presence of lithium hydroxide. After coupling is complete, the dyestuff which precipitates is filtered off and dried. The dyestuff corresponding to the formula

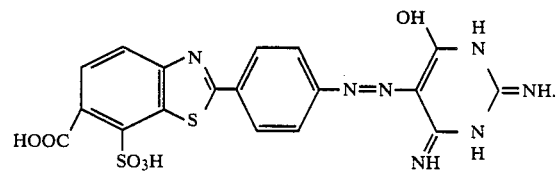

is obtained in lithium salt form. It dyes paper a brilliant neutral-yellow shade. The wet fastness properties of these paper dyeings are notably good; the back water is colourless.

EXAMPLE 57

If in Example 56, 4.5 parts of 2-cyanimino-4-amino-6-hydroxypyrimidine are employed instead of 2.7 parts of 2,4-diamino-6-hydroxypyrimidine the lithium salt of the dyestuff corresponding to the formula

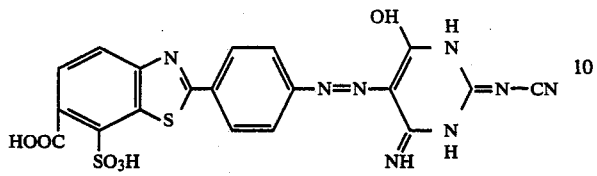

is obtained. It dyes paper a brilliant reddish-yellow shade. The wet fastness properties of these paper dyeings and their properties with respect to back water coloration are very good.

EXAMPLE 58

8 Parts of 2-(4'-aminophenyl)-6-methylbenzothiazole-3',7-disulphonic acid are dissolved in 100 parts of water whilst stirring and then 7 parts of 30% hydrochloric acid are added. To this solution which is cooled to 5° 6 parts of 4N sodium nitrite solution are added. Any excess nitrous acid in the diazo solution thus obtained is decomposed by the addition of sulphamic acid. Subsequently, 2.7 parts of 2,4-diamino-6-hydroxypyrimidine are added. Coupling commences when by the addition of sodium carbonate the pH is adjusted to an alkaline range. An orange-coloured suspension is obtained. After coupling is complete, 20 parts of 30% hydrochloric acid are added, and then the strongly acidic suspension is filtered off and washed with water. The obtained press cake is added to a preparation consisting of 200 parts of water and 15 parts of lithium hydroxide. The mixture is heated to 70° whereby a solution is obtained. After cooling down, the dyestuff corresponding to the formula

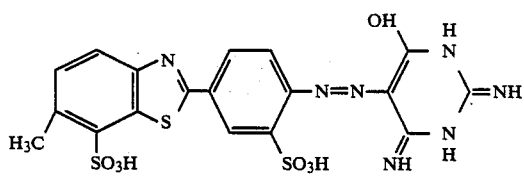

crystallizes in lithium salt form. It dyes paper a neutral-yellow shade. The resultant back water is colourless. These paper dyeings have notably good wet fastness properties.

EXAMPLE 59

32 Parts 2-(4'-aminophenyl)-6-methylbenzothiazole-7-sulphonic acid are stirred into 300 parts of water followed by the addition of 11 parts of 30% hydrochloric acid. Then 27 parts of 4N sodium nitrite solution are slowly added dropwise, and the temperature is kept at 15°–20°. After stirring for two hours, any excess nitrous acid is decomposed by adding a small amount of sulphamic acid. Subsequently, the obtained diazo suspension is added dropwise to a preparation consisting of 13 parts of 2,4-diamino-6-hydroxypyrimidine and 125 parts of 24.5% tetramethylammonium hydroxide solution. Coupling commences immediately. After coupling is complete, the solution is filtered clear. A storage-stable dyeing preparation is obtained which is ready for use and contains the dyestuff which corresponds to the formula

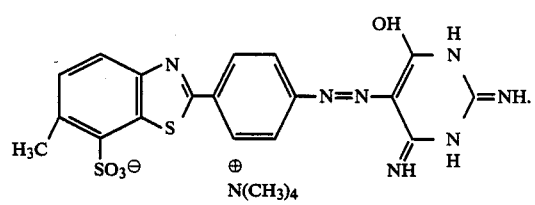

This preparation dyes paper a brilliant neutral-yellow shade; the back water is practically colourless. The paper dyeings thus obtained have notably good dyeing properties.

EXAMPLE 60

If in Example 59, 13.2 parts of barbituric acid are employed instead of 13 parts of 2,4-diamino-6-hydroxypyrimidine, a storage-stable dyeing preparation is obtained and contains the dyestuff in salt form which corresponds to the formula

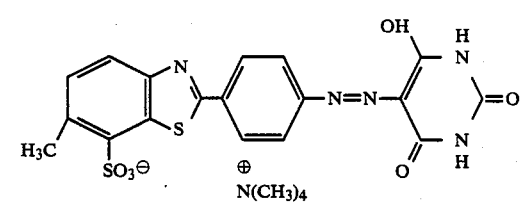

and dyes paper a yellow shade. The paper dyeings show high general fastness properties.

If in Example 59 or 60 instead of tetramethylammonium hydroxide equimolar amounts of one of the quaternary ammonium hydroxides given for Examples 50a to 50j or 50l to 50x are used, storage-stable dye preparations which have good dyeing properties may be obtained

EXAMPLE 61

If in Example 59 instead of the tetramethylammonium hydroxide solution 33 parts of the bisquaternary ammonium hydroxide of the formula

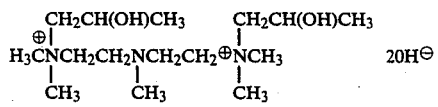

(prepared by the addition of propylene oxide to the compound of the formula

are used, a yellow storage-stable dye preparation is obtained containing the dyestuff of the formula

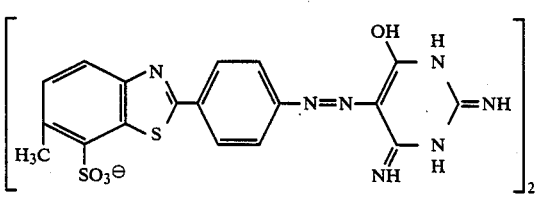

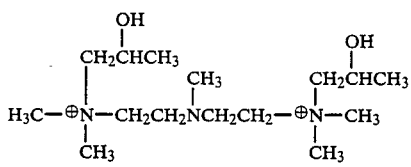

The resultant solution is a liquid of low viscosity; it is therefore easily used. This dyeing preparation dyes paper a brilliant neutral-yellow shade.

In the following examples the application of the compounds of this invention as well as liquid aqeuous dyeing preparations thereof is illustrated.

APPLICATION EXAMPLE A

70 Parts of chemically bleached sulphite cellulose obtained from pinewood and 30 parts of chemically bleached sulphite cellulose obtained from birchwood are ground in a Hollander in 2000 parts of water. 0.2 Parts of the dyestuff of Example 1, 55 or 58 are sprinkled into this pulp or 1.0 part of the liquid dyestuff preparation according to Example 49, 53 or 59 are added to this pulp. After mixing for 20 minutes, paper is produced from this pulp. The absorbent paper obtained in this way is dyed a brilliant yellow shade (reddish-yellow shade, respectively). The waste water is practically colourless.

APPLICATION EXAMPLE B 0.5 Parts of the dyestuff of Example 1, 55 or 58 are dissolved in 100 parts of hot water, and the solution is cooled to room temperature. This solution is added to 100 parts of chemically bleached sulphite cellulose which have been ground in a Hollander with 2000 parts of water. After thorough mixing for 15 minutes, sizing takes place in the usual way with rosin size and aluminium sulphate. Paper which is produced from this material is of brilliant yellow shade (reddish-yellow shade, respectively) and has good waste water and wet fastness properties.

APPLICATION EXAMPLE C

An absorbent length of unsized paper is drawn at 40°–50° through a dyestuff solution having the following composition:
0.5 parts of the dyestuff of Example 1, 55 or 58 or of the liquid dye preparation according to Example 49, 53 or 59
0.5 parts of starch, and
99.0 parts of water.

The excess dyestuff solution is squeezed out through two rollers. The dried length of paper is dyed in a yellow (reddish-yellow) shade.

The dyestuffs or liquid dyestuff preparations of the remaining examples may also be used for dyeing paper according to Application Examples A to C.

APPLICATION EXAMPLE D (LEATHER)

100 Parts of intermediately dried chrome velours leather are agitated for one hour at 50° in a vessel with a liquor consisting of 400 parts of water, 2 parts of 25% ammonium hydroxide solution and 0.2 parts of a conventional wetting agent. Then the liquor is run off. To the agitated still wet chrome velours leather 400 parts of water at 60° and 1 part 25% ammonium hydroxide solution are added. After the addition of 5 parts of the dyestuff of Example 1 dissolved in 200 parts of water, dyeing is effected during 90 minutes at 60°. Subsequently, 50 parts of 8% formic acid are slowly added to adjust to an acidic pH, and agitation is continued for a further 30 minutes. The leather is then rinsed, dried and prepared in the normal way giving a leather evenly dyed in a yellow tone with good light fastness properties.

APPLICATION EXAMPLE E (COTTON)

To a dyebath consisting of 3000 parts of demineralized water, 2 parts of sodium carbonate and 1 part of the dyestuff of Example 1, 100 parts of pre-wetted cotton fabric are added at 30°. After the addition of 10 parts of sodium sulphate, the dyebath is heated to the boil within 30 minutes whereby, at a temperature of 50° and 70°, at each of these stages a further 10 parts of sodium sulphate are added. Dyeing is continued for a further 15 minutes at the boil followed by the addition of a further 10 parts of sodium sulphate. The dyebath is then cooled down. At 50° the dyed fabric is removed from the dye liquor, rinsed with water and dried at 60°. A golden-yellow cotton dyeing is obtained having good light and wet fastness properties.

APPLICATION EXAMPLE F (POLYAMIDE)

0.1 Parts of the dyestuff of Example 1 are dissolved in 300 parts of water, and 0.2 parts of ammonium sulphate are added to this solution. Then the pre-wetted textile fabric (5 parts wool gaberdine or 5 parts nylon satin) is entered into the bath which is heated to the boil during the course of 30 minutes. The water that evaporates during the dyeing process for 30 minutes is replaced, and dyeing at the boil is continued for a further 30 minutes. cFinally, the dyed fabric is removed from the liquor and rinsed with water. After drying a clear yellow polyamide dyeing is obtained having good light and wet fastness properties.

In analogous manner as described in Application Examples D to F the dyestuffs of the remaining examples may be used for dyeing. The substrates thus obtained are dyed in a yellow tone and have good fastness properties.

What is claimed is:

1. A compound of the formula

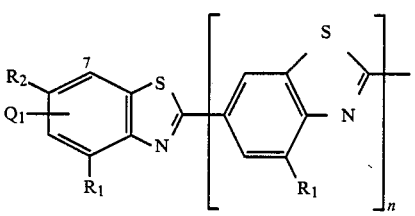

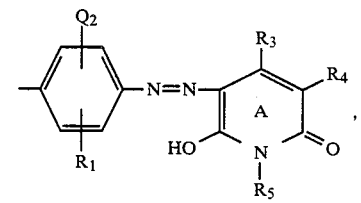

or an internal, external or acid addition salt thereof, wherein each of $Q_1$ and $Q_2$ is independently hydrogen or $-SO_3M_1$, each $R_1$ and $R_2$ is independently hydrogen, $C_{1-4}$alkyl, $C_{1-4}$alkoxy or $-COOM$, $R_3$ is hydrogen; cyano; amino; hydroxy; $C_{1-4}$-alkoxy; $C_{1-4}$alkyl; $C_{2-4}$alkyl monosubstituted by hydroxy or $C_{1-4}$alkoxy; $C_{5-6}$cycloalkyl; phenyl; phenyl substituted by 1 to 3 substituents selected from $C_{1-4}$alkyl, $C_{1-4}$-alkoxy, halo, $-COOM$ and $-SO_3M$; phenyl($C_{1-4}$-alkyl); phenyl($C_{1-4}$alkyl) the phenyl group of which is substituted by 1 to 3 substituents selected from $C_{1-4}$alkyl, $C_{1-4}$alkoxy, halo, $-COOM$ and $-SO_3M$; $-CO-R_6$; $-(CH_2)_b-R_7$; or a saturated or unsaturated 5- or 6-membered heterocyclic ring containing 1 to 3 hetero atoms, which ring is unsubstituted or substituted by 1 to 3 $C_{1-4}$alkyl groups and is bound to Ring A by a carbon or nitrogen atom directly or via a bridge member, with the proviso that any

is bound via a bridge member, wherein $R_6$ is hydroxy, amino or $C_{1-4}$alkoxy, $R_7$ is cyano, halo, $-SO_3M$, $-OSO_3M$, $-CO-R_8$ or pyridyl-4, wherein $R_8$ is hydroxy; amino; $C_{1-4}$alkyl; $C_{1-4}$alkyl monosubstituted by hydroxy, halo, cyano or $C_{1-4}$alkoxy; $C_{1-4}$-alkoxy; phenyl; phenyl substituted by 1 to 3 substituents selected from $C_{1-4}$alkyl, $C_{1-4}$-alkoxy, halo, $-COOM$ and $-SO_3M$; phenoxy; phenyl($C_{1-4}$alkyl); or phenoxy or phenyl-($C_{1-4}$alkyl) the phenyl group of which is substituted by 1 to 3 substituents selected from $C_{1-4}$alkyl, $C_{1-4}$-alkoxy, halo $-COOM$ and $-SO_3M$, and b is 1, 2 or 3, $R_4$ is hydrogen; cyano; halo; $-SO_3M$; nitroso; nitro; $-NR_9R_{10}$; $C_{1-4}$alkyl; $C_{1-4}$alkyl monosubstituted by hydroxy, halo, cyano, $C_{1-4}$alkoxy, phenyl, $-SO_3M$ or $-OSO_3M$; $-SO_2NH_2$; $-CO-R_{11}$; $-CH_2-NH-CO-R_{12}-E$; a group of the formula

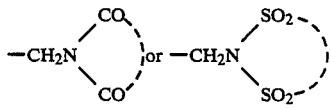

wherein the two carbonyl or sulfonyl groups are bound to two carbon atoms of an aromatic ring that are ortho to each other; a group of the formula

which is a 5- or 6-membered ring containing 1 to 3 hetero atoms which is unsubstituted or substituted by 1 or 2 methyl groups or by amino, $C_{1-4}$alkylamino or N,N-di-($C_{1-4}$alkyl)amino; benzoimidazolium-1; benzoimidazolium-1 monosubstituted by methyl, amino, methylamino or dimethylamino; or a group of the formula

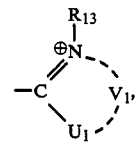

wherein each of $R_9$ and $R_{10}$ is independently hydrogen; $C_{1-4}$alkyl; $C_{1-4}$alkyl monosubstituted by hydroxy, halo, cyano, $C_{1-4}$alkoxy or phenyl; or $-CO-R_{12}$-E, $R_{11}$ is hydroxy; amino; $C_{1-4}$alkyl-amino; N,N-di-($C_{1-4}$alkyl)amino; $C_{1-4}$alkyl; $C_{1-4}$alkoxy; phenyl; phenyl substituted by 1 to 3 substituents selected from $C_{1-4}$-alkyl, $C_{1-4}$alkoxy, halo, $-COOM$ and $-SO_3M$; phenoxy; or phenoxy the phenyl group of which is substituted by 1 to 3 substituents selected from $C_{1-4}$alkyl, $C_{1-4}$-alkoxy, halo, $-COOM$ and $-SO_3M$, $R_{13}$ is hydrogen, $C_{1-4}$alkyl or $C_{1-4}$-alkyl monosubstituted by hydroxy, halo, cyano, $C_{1-4}$alkoxy or phenyl, $U_1$ is $-S-$, $-NH-$ or

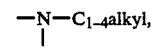

and $V_1$ is a radical which, together with the

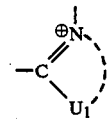

radical, forms a 5- or 6-membered ring or a 5- or 6-membered ring fused to a 5- or 6-membered carbocyclic ring or to a 5- or 6-membered heterocyclic ring containing 1 or 2 hetero atoms, or $R_3$ and $R_4$ taken together form a 3 or 4 carbon atom chain or a 3 or 4 carbon atom chain that forms part of a further 5- or 6-membered ring by 2 vicinal chain members, and $R_5$ is hydrogen; $-NR_{14}R_{15}$; $C_{1-6}$alkyl; $C_{2-4}$-alkenyl; $C_{2-4}$alkynyl; $C_{1-6}$alkyl monosubstituted by hydroxy, cyano, $C_{1-4}$alkoxy, acetamido, $-CO-R_{16}$, $-SO_3M$ or $-OSO_3M$; $C_{5-6}$cycloalkyl; phenyl; phenyl substituted by 1 to 3 substituents selected from $C_{1-4}$alkyl, $C_{1-4}$-alkoxy, halo, nitro, amino, $-COOM$ and $-SO_3M$; phenyl($C_{1-4}$alkyl); phenyl($C_{1-4}$alkyl) the phenyl group of which is substituted by 1 to 3 substituents selected from $C_{1-4}$alkyl, $C_{1-4}$alkoxy, halo, nitro, amino, $-COOM$ and $-SO_3M$; $-R_{12}-E_1$;

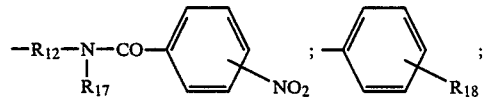

or a saturated or unsaturated 5- or 6-membered heterocyclic ring containing 1 or 2 hetero atoms, which ring is unsubstituted or substituted by 1 to 3 methyl groups or by amino, $C_{1-4}$alkylamino or N,N-di-($C_{1-4}$alkyl)-amino and is bound by a carbon or nitrogen atom, wherein $E_1$ is a protonatable amino group, a quaternary ammonium group, a hydrazinium group or

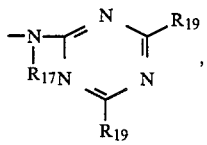

wherein
each $R_{19}$ is independently halo, amino or an aliphatic amino group,
each of $R_{14}$ and $R_{15}$ is independently hydrogen; $C_{1-4}$alkyl; $C_{1-4}$alkyl monosubstituted by hydroxy, halo, cyano or $C_{1-4}$alkoxy; phenyl; or phenyl substituted by 1 or 2 substituents selected from halo, $C_{1-4}$alkyl and $C_{1-4}$alkoxy,
$R_{16}$ is hydroxy or $C_{1-4}$alkoxy, and
$R_{18}$ is $E_2$, —NH—CO—$R_{12}$—$E_2$, —SO$_2$—NH—$R_{12}$—$E_2$ or —CO—NH—$R_{12}$—$E_2$, wherein $E_2$ is a protonatable amino group, a quaternary ammonium group or a hydrazinium group, and
n is 0 or 1,
wherein
each E is independently hydrogen, halo, a protonatable amino group, a quaternary ammonium group, a hydrazinium group, —SO$_3$M or —OSO$_3$M,
each $R_{12}$ is independently linear or branched $C_{1-6}$-alkylene, and
each $R_{17}$ is independently hydrogen or $C_{1-4}$alkyl,
wherein
each M and $M_1$ is independently hydrogen or a non-chromophoric cation, and
each halo is independently fluoro, chloro or bromo,
with the provisos that (i) the compound contains at least one —SO$_3$M or —SO$_3$M$_1$ group, (ii) at least one of $R_4$ and $R_5$ is hydrogen, (iii) the total number of anionic groups equals or exceeds the total number of basic and cationic groups, (iv) the positive charge of each cationic group is balanced by the negative charge of an —SO$_3^\ominus$ or —COO$^\ominus$ group of the molecule or of an external non-chromophoric anion, and (v) the hydroxy group of any hydroxyalkyl group attached to a nitrogen atom is in other than the 1-position.

2. A compound according to claim 1, or an internal, external or acid addition salt thereof, wherein
$Q_1$ is 7—SO$_3$M$_1$, each
$R_1$ is independently hydrogen, methyl, ethyl, methoxy or ethoxy,
$R_2$ is methyl, methoxy, ethoxy or —COOM, and
n is 0.

3. A compound according to claim 1, or an internal, external or acid addition salt thereof, wherein
$R_3$ is hydrogen; cyano; amino; hydroxy; methyl; ethyl; hydroxyethyl; ($C_{1-2}$alkoxy)ethyl; methoxy; ethoxy; cyclohexyl; phenyl; phenyl substituted by 1 or 2 substituents selected from methyl, methoxy, chloro, —COOM and —SO$_3$M; phenyl ($C_{1-2}$alkyl); phenyl($C_{1-2}$alkyl) the phenyl group of which is substituted by 1 or 2 substituents selected from methyl, methoxy, chloro, —COOM and —SO$_3$M;

pyridiniummethyl; —CO—$R_{6a}$; or —(CH$_2$)$_d$—$R_{7a}$,
wherein
$R_{6a}$ is hydroxy, amino, methoxy or ethoxy,
$R_{7a}$ is cyano, chloro, —SO$_3$M, —OSO$_3$M, pyridyl-4 or —CO—$R_{8a}$, wherein
$R_{8a}$ is hydroxy, amino, methyl, ethyl, methoxy or ethoxy, and
d is 1 or 2,
$R_4$ is hydrogen; cyano; chloro; bromo; —SO$_3$M; —NR$_{9a}$R$_{10a}$; $C_{1-2}$alkyl; $C_{1-2}$alkyl monosubstituted by hydroxy, phenyl, —SO$_3$M or —OSO$_3$M; —CO—$R_{11a}$; —CH$_2$—$_{NH-CO-R12a}$—B$_2$; pyridinium; pyrimidinium; benzoimidazolium; or pyridinium, pyrimidinium or benzoimidazolium monosubstituted by methyl, amino, methylamino or dimethylamino, wherein
each of $R_{9a}$ and $R_{10a}$ is independently hydrogen; $C_{1-2}$alkyl; $C_{1-2}$alkyl monosubstituted by hydroxy, $C_{1-2}$alkoxy or phenyl; or —CO—$R_{12a}$—$E_a$, wherein
$E_a$ is hydrogen, chloro, B$_2$ or —SO$_3$M, and
$R_{11a}$ is hydroxy, amino, methylamino, dimethylamino, methyl, ethyl, methoxy or ethoxy, and
$R_5$ is hydrogen; —NR$_{14a}$R$_{15a}$; phenyl; phenyl($C_{1-2}$alkyl); cyclohexyl; $C_{1-4}$alkyl; $C_{1-4}$alkyl monosubstituted by hydroxy, cyano, $C_{1-2}$alkoxy, —CO—$R_{16a}$, —SO$_3$M or —OSO$_3$M; —$R_{12b}$-$E_{1a}$;

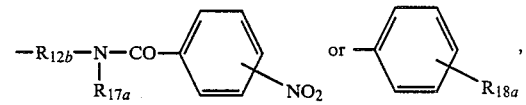

wherein
$E_{1a}$ is —NR$_{22}$R$_{23}$, —N$^\oplus$R$_{24}$R$_{25}$R$_{26}$,

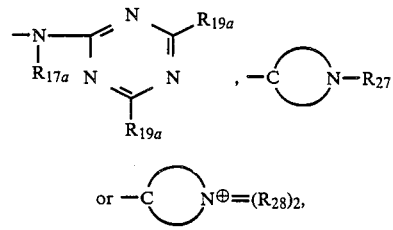

or —C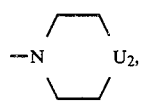N$^\oplus$=(R$_{28}$)$_2$, wherein each
$R_{19a}$ is independently fluoro, chloro or —N(R$_{30}$)$_2$, wherein each $R_{30}$ is independently hydrogen, $C_{1-2}$alkyl or $C_{1-2}$alkyl monosubstituted by hydroxy, cyano or $C_{1-2}$alkoxy,
each of $R_{22}$ and $R_{23}$ is independently hydrogen; $C_{1-4}$alkyl; $C_{2-4}$alkyl monosubstituted by hydroxy, $C_{1-4}$alkoxy, halo or cyano; phenyl; phenyl substituted by 1 to 3 substituents selected from chloro, $C_{1-4}$alkyl and $C_{1-4}$-alkoxy; phenyl($C_{1-4}$alkyl); phenyl($C_{1-4}$alkyl) the phenyl group of which is substituted by 1 to 3 substituents selected from chloro, $C_{1-4}$alkyl and $C_{1-4}$-alkoxy; or $C_{5-6}$-cycloalkyl; or —NR$_{22}$R$_{23}$ is

—N⟨    ⟩U$_2$, wherein $U_2$ is a direct bond, $-CH_2-$, $-O-$, $-S-$, $-SO-$, $-SO_2-$, $-NH-$,

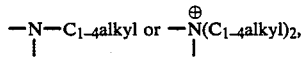

each of $R_{24}$ and $R_{25}$ is independently $C_{1-4}$-alkyl; $C_{2-4}$alkyl monosubstituted by hydroxy, $C_{1-4}$-alkoxy, halo or cyano; phenyl; phenyl substituted by 1 to 3 substituents selected from chloro, $C_{1-4}$alkyl and $C_{1-4}$alkoxy; phenyl($C_{1-4}$alkyl); phenyl($C_{1-4}$alkyl) the phenyl group of which is substituted by 1 to 3 substituents selected from chloro, $C_{1-4}$-alkyl and $C_{1-4}$-alkoxy; or $C_{5-6}$-cycloalkyl, and $R_{26}$ is $C_{1-4}$alkyl or phenyl($C_{1-4}$alkyl), or $-N^{\oplus}R_{24}R_{25}R_{26}$ is pyridinium, pyridinium substituted by 1 or 2 methyl groups or

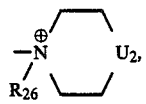

wherein $R_{26}$ and $U_2$ are as defined above,
$R_{27}$ is hydrogen or $C_{1-4}$alkyl,
each $R_{28}$ is independently $C_{1-4}$alkyl, and
each of

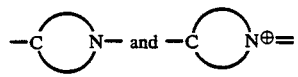

is a protonatable or quaternized saturated, partially saturated or unsaturated 5- or 6-membered nitrogen containing heterocyclic ring,
$R_{12b}$ is linear or branched $C_{1-3}$alkylene,
each of $R_{14a}$ and $R_{15a}$ is independently hydrogen, methyl, ethyl or phenyl,
$R_{16a}$ is hydroxy, methoxy or ethoxy, and
$R_{18a}$ is $B_2$, $-NH-CO-R_{12a}-B_2$, $-SO_2-NH-R_{12a}-B_2$ or $-CO-NH-R_{12a}-B_2$,
wherein each $B_2$ is independently $-NR_{22a}R_{23a}$ or $-N^{\oplus}R_{24a}R_{25a}R_{26a}$,
wherein each of $R_{22a}$ and $R_{23a}$ is independently hydrogen, $C_{1-2}$alkyl, n—$C_{2-3}$hydroxyalkyl, phenyl or benzyl, or
$-NR_{22a}R_{23a}$ is pyrrolidino, piperidino, morpholino, piperazino or N-methylpiperazino,
each of $R_{24a}$ and $R_{25a}$ is independently $C_{1-2}$alkyl, n—$C_{2-3}$-hydroxyalkyl, phenyl or benzyl, and
$R_{26a}$ is methyl, ethyl or benzyl, or

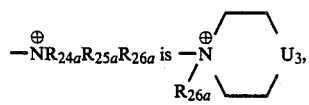

pyridinium or pyridinium substituted by 1 or 2 methyl groups, wherein
$U_3$ is a direct bond, $-CH_2-$, $-O-$, $-NH-$ or $-NCH_3-$, and
$R_{26a}$ is as defined above,
each $R_{12a}$ is independently $C_{1-2}$alkylene, and each $R_{17a}$ is independently hydrogen or methyl.

4. A compound according to claim 3 having the formula

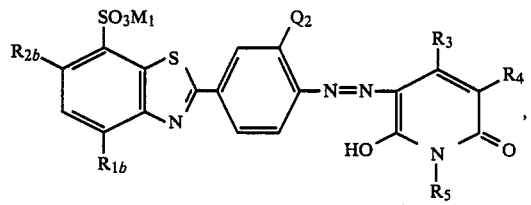

or an internal, external or acid addition salt thereof, wherein
$Q_2$ is hydrogen or $-SO_3M_1$,
$R_{1b}$ is hydrogen, methyl, ethyl, methoxy or ethoxy, and
$R_{2b}$ is methyl, methoxy, ethoxy or $-COOM$.

5. A compound according to claim 3, or an internal, external or acid addition salt thereof, wherein
$R_3$ is amino, methyl or phenyl,
$R_4$ is hydrogen, cyano, $-CO-R_{11b}$, pyridinium or methylpyridinium, wherein $R_{11b}$ is amino, methyl, ethyl, methoxy or ethoxy, and
$R_5$ is hydrogen, ethyl, 2-hydroxyethyl, $-(CH_2)_g-B_3$,

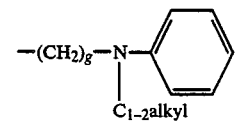

or

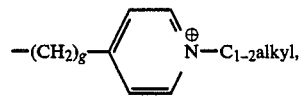

wherein $B_3$ is $-NR_{22b}R_{23b}$ or $-N^{\oplus}R_{24b}R_{25b}R_{26b}$, wherein
each of $R_{22b}$ and $R_{23b}$ is independently hydrogen, methyl or ethyl, or
$-NR_{22b}R_{23b}$ is piperidino, morpholino, piperazino or N-methylpiperazino, and
each of $R_{24b}$, $R_{25b}$ and $R_{26b}$ is independently methyl or ethyl, or

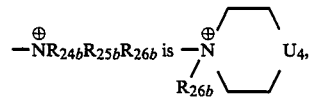

pyridinium or pyridinium substituted by 1 or 2 methyl groups, wherein
$U_4$ is $-CH_2-$, $-O-$, $-NH-$ or $-NCH_3-$, and
$R_{26b}$ is as defined above, and
g is 2 or 3.

6. A compound according to claim 5 having the formula

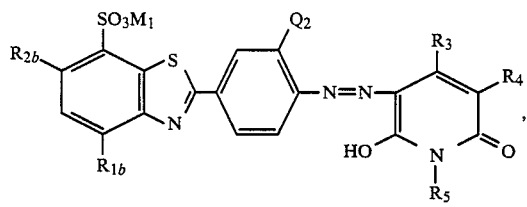

or an internal, external or acid addition salt thereof, wherein $Q_2$ is hydrogen or —$SO_3M_1$, $R_{1b}$ is hydrogen, methyl, ethyl, methoxy or ethoxy, and $R_{2b}$ is methyl, methoxy, ethoxy or —COOM.

7. A compound according to claim 6 wherein $R_3$ is methyl, $R_4$ is hydrogen, cyano or carbamoyl, and $R_5$ is hydrogen.

8. A compound according to claim 5 wherein $R_3$ is methyl, $R_4$ is hydrogen, cyano or carbamoyl, and $R_5$ is hydrogen.

9. The compound according to claim 8 having the formula

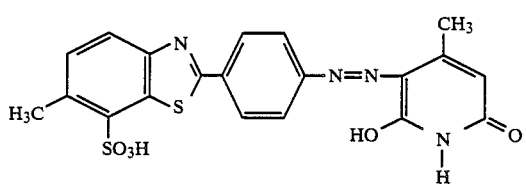

or an external salt thereof.

10. The compound according to claim 9.

11. The compound according to claim 9 in sodium salt form.

12. The compound according to claim 8 having the formula

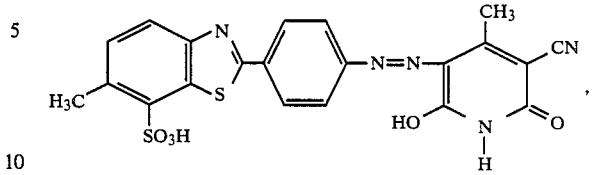

or an external salt thereof.

13. The compound according to claim 12.

14. The compound according to claim 12 in sodium salt form.

15. The compound according to claim 6 having the formula

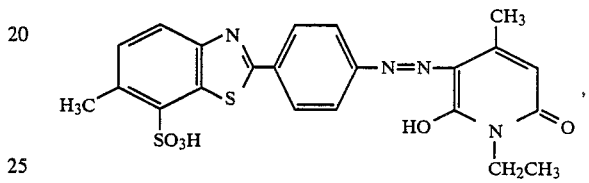

or an external salt thereof.

16. The compound according to claim 15.

17. The compound according to claim 15 in sodium salt form.

18. A storage-stable, liquid aqueous dyeing preparation containing a compound according to claim 1 in water-soluble salt form.

19. A process for dyeing or printing comprising applying to a hydroxy group- or nitrogen-containing organic substrate a compound according to claim 1 in water-soluble salt form.

20. A process according to claim 19 wherein the substrate is a textile consisting of or containing cellulose material, leather or paper.

* * * * *